United States Patent
Dai et al.

(10) Patent No.: US 10,996,435 B2
(45) Date of Patent: May 4, 2021

(54) OPTICAL IMAGING SYSTEM

(71) Applicant: Zhejiang Sunny Optical Co., Ltd, Ningbo (CN)

(72) Inventors: Fujian Dai, Ningbo (CN); Jianke Wenren, Ningbo (CN)

(73) Assignee: Zhejiang Sunny Optical Co., Ltd, Ningbo (CN)

( * ) Notice: Subject to any disclaimer, the term of this patent is extended or adjusted under 35 U.S.C. 154(b) by 396 days.

(21) Appl. No.: 15/772,854

(22) PCT Filed: Sep. 21, 2017

(86) PCT No.: PCT/CN2017/102633
§ 371 (c)(1),
(2) Date: May 2, 2018

(87) PCT Pub. No.: WO2018/209855
PCT Pub. Date: Nov. 22, 2018

(65) Prior Publication Data
US 2020/0257084 A1    Aug. 13, 2020

(30) Foreign Application Priority Data

May 15, 2017 (CN) .......................... 201710338407.9
May 15, 2017 (CN) .......................... 201720531917.3

(51) Int. Cl.
G02B 13/00 (2006.01)
G02B 9/64 (2006.01)
G02B 9/60 (2006.01)

(52) U.S. Cl.
CPC ........... G02B 13/0045 (2013.01); G02B 9/60 (2013.01); G02B 9/64 (2013.01)

(58) Field of Classification Search
CPC ......... G02B 13/0045; G02B 9/60; G02B 9/64
See application file for complete search history.

(56) References Cited

U.S. PATENT DOCUMENTS

| 2014/0009843 | A1 | 1/2014 | Tsai et al. |
| 2014/0043694 | A1 | 2/2014 | Tsai et al. |
| 2016/0033742 | A1 | 2/2016 | Huang |

(Continued)

FOREIGN PATENT DOCUMENTS

| CN | 106154513 | * 11/2016 | ............. G02B 13/00 |
| CN | 107153257 A | 9/2017 | |

(Continued)

*Primary Examiner* — George G King
(74) *Attorney, Agent, or Firm* — Sughrue Mion, PLLC

(57) ABSTRACT

The present disclosure discloses an optical imaging system, the optical imaging system having an effective focal length f and an entrance pupil diameter EPD, and comprising sequentially, along an optical axis from an object side to an image side, a first lens, a second lens, a third lens, a fourth lens, a fifth lens, a sixth lens and a seventh lens. The third lens has a negative refractive power; the fifth lens has a positive refractive power or a negative refractive power, and an image side surface of the fifth lens is a convex surface; the seventh lens has a positive refractive power or a negative refractive power, and an object side surface of the seventh lens is a concave surface; the first lens, the second lens, the fourth lens, and the sixth lens respectively have a positive refractive power or a negative refractive power.

17 Claims, 14 Drawing Sheets

(56) References Cited

U.S. PATENT DOCUMENTS

| | | | |
|---|---|---|---|
| 2016/0139372 A1 | 5/2016 | Tanaka | |
| 2016/0282587 A1 | 9/2016 | Hashimoto | |
| 2017/0003482 A1* | 1/2017 | Chen | H04N 5/225 |
| 2017/0052350 A1* | 2/2017 | Chen | G02B 3/04 |
| 2017/0329108 A1* | 11/2017 | Hashimoto | G02B 13/0045 |
| 2018/0180856 A1* | 6/2018 | Jung | G02B 13/0045 |

FOREIGN PATENT DOCUMENTS

| | | | | |
|---|---|---|---|---|
| CN | 107300751 | * | 10/2017 | G02B 13/00 |
| JP | 2017116594 | * | 6/2017 | G02B 13/0045 |
| KR | 2018/0076742 | * | 7/2018 | G02B 13/0045 |

* cited by examiner

OPTICAL IMAGING SYSTEM

CROSS-REFERENCE TO RELATED APPLICATIONS

This application is a National Stage of International Application No. PCT/CN2017/102633 filed Sep. 21, 2017 which claims the priorities and rights of Chinese Patent Application No. 201710338407.9 and Chinese Patent Application No. 201720531917.3 filed with the State Intellectual Property Office of China (SIPO) on May 15, 2017, the disclosures of which are hereby incorporated by reference in their entireties.

TECHNICAL FIELD

The present disclosure relates to an optical imaging system, and specifically, relates to an optical imaging system composed of seven lenses.

BACKGROUND

As the science and technology develop, there is an increasing demand for high-resolution lens assemblies in mobile phones on the mobile phone market. Since thicknesses of the mobile phones are reduced, the total length of a lens assembly is limited, thereby increasing the difficulty in designing a mobile phone lens assembly. Currently, an often used photosensitive element in an optical system is a CCD (Charge-Coupled Device) or a complementary metal-oxide semiconductor (CMOS). As imaging sensors enhance their performances and become smaller in size, corresponding camera lens assemblies also need to satisfy requirements on the high image quality and miniaturization.

To satisfy the miniaturization requirement, a typical configuration of an existing lens assembly has an F-number of 2.0 or above. However, with the constant development of smart phones and other portable electronic products, higher requirements on imaging lens assemblies are brought forward, especially in situations such as lack of light (e.g., cloudy and rainy days, dusk, etc.) and hand trembling, thus the F-number of 2.0 or above has been unable to meet higher order imaging requirements.

Therefore, the present invention proposes a miniaturized optical imaging system having a large aperture and a high image quality.

SUMMARY

The technical solution provided by the present disclosure at least partially solves the technical problems described above.

According to an aspect, the present disclosure provides an optical imaging system, the optical imaging system having an effective focal length f and an entrance pupil diameter EPD, and comprising sequentially, along an optical axis from an object side to an image side, a first lens, a second lens, a third lens, a fourth lens, a fifth lens, a sixth lens and a seventh lens. The third lens has a negative refractive power; the fifth lens has a positive refractive power or a negative refractive power, and an image side surface of the fifth lens is a convex surface; the seventh lens has a positive refractive power or a negative refractive power, and an object side surface of the seventh lens is a concave surface; the first lens, the second lens, the fourth lens, and the sixth lens respectively have a positive refractive power or a negative refractive power; and a distance TTL from an object side surface of the first lens to an image plane on the optical axis and half of a diagonal length ImgH of an effective pixel area on the image plane of the optical imaging system satisfy: TTL/ImgH<1.6, for example, TTL/ImgH≤1.546.

In the present disclosure, a plurality of pieces (for example, seven pieces) of lenses are used. By properly allocating a relationship between the total effective focal length and the entrance pupil diameter of the optical imaging system, the system is enabled to have a large aperture advantage in the process of increasing an amount of light admitted, and an image effect in a dark environment is enhanced; at the same time an aberration of an edge field of view is reduced.

According to another aspect, the present disclosure further provides an optical imaging system, the optical imaging system having an effective focal length f and an entrance pupil diameter EPD, and comprising sequentially, along an optical axis from an object side to an image side, a first lens, a second lens, a third lens, a fourth lens, a fifth lens, and a plurality of subsequent lenses. The third lens has a negative refractive power; the fifth lens has a positive refractive power or a negative refractive power, and an image side surface of the fifth lens is a convex surface; the first lens, the second lens and the fourth lens respectively have a positive refractive power or a negative refractive power; and a distance SL from an aperture of the optical imaging system to an image plane on the optical axis and a distance TTL from an object side surface of the first lens to the image plane on the optical axis may satisfy: SL/TTL<0.85, for example, SL/TTL≤0.808.

In an implementation, the effective focal length f of the optical imaging system and the entrance pupil diameter EPD of the optical imaging system may satisfy: f/EPD<1.6, for example, f/EPD≤1.550.

In an implementation, a center thickness CT1 of the first lens on the optical axis, a center thickness CT2 of the second lens on the optical axis and a center thickness CT4 of the fourth lens on the optical axis may satisfy: 1.5<(CT1+CT2)/CT4<2.3, for example: 1.880≤(CT1+CT2)/CT4≤2.140.

In an implementation, the center thickness CT2 of the second lens on the optical axis and the center thickness CT4 of the fourth lens on the optical axis may satisfy: 0.75<CT2/CT4<1.5, for example: 0.794≤CT2/CT4≤1.498.

In an implementation, a distance SAG41 from an intersection point of an object side surface of the fourth lens and the optical axis to an effective radius vertex of the object side surface of the fourth lens on the optical axis and a distance SAG42 from an intersection point of an image side surface of the fourth lens and the optical axis to an effective radius vertex of the image side surface of the fourth lens on the optical axis may satisfy: 0<SAG41/SAG42<0.5, for example: 0.016≤SAG41/SAG42≤0.439.

In an implementation, a combined focal length f12 of the first lens and the second lens and a combined focal length f56 of the fifth lens and the sixth lens may satisfy: 0.6<f12/f56<1.2, for example: 0.796≤f12/f56≤561.109.

In an implementation, an effective radius DT11 of the object side surface of the first lens and an effective radius DT52 of the image side surface of the fifth lens may satisfy: 0.7<DT11/DT52<1, for example: 0.822≤DT11/DT52≤0.922.

In an implementation, the half of the diagonal length ImgH of the effective pixel area on the image plane of the optical imaging system and the effective focal length f of the optical imaging system may satisfy: 0.8<ImgH/f<1, for example: 0.844≤ImgH/f≤0.871.

In an implementation, a spacing distance T34 between the third lens and the fourth lens on the optical axis and a spacing distance T45 between the fourth lens and the fifth lens on the optical axis may satisfy: 0.5<T34/T45<1, for example: 0.540≤T34/T45≤0.886.

In an implementation, an effective focal length f5 of the fifth lens and an effective focal length f7 of the seventh lens may satisfy: 1.5<|f5/f7|<2.5, for example: 1.506≤|f5/f7|≤2.322.

In an implementation, a radius of curvature R13 of the object side surface of the seventh lens and a radius of curvature R14 of an image side surface of the seventh lens may satisfy: −1.8<R13/R14<−1, for example: −1.778≤R13/R14≤−1.099.

The optical imaging system with the above configuration may further have at least one of the beneficial effects of ultra-thin, miniaturization, a large aperture, a high image quality, a low sensitivity, balanced aberrations, a better ability of eliminating distortion and the like.

BRIEF DESCRIPTION OF THE DRAWINGS

The above and other advantages of implementations of the present disclosure will become apparent from the following detailed description with reference to the accompanying drawings, which are intended to illustrate the exemplary implementations of the present disclosure rather than limit them. In the drawings.

DETAILED DESCRIPTION OF EMBODIMENTS

Figure 1:
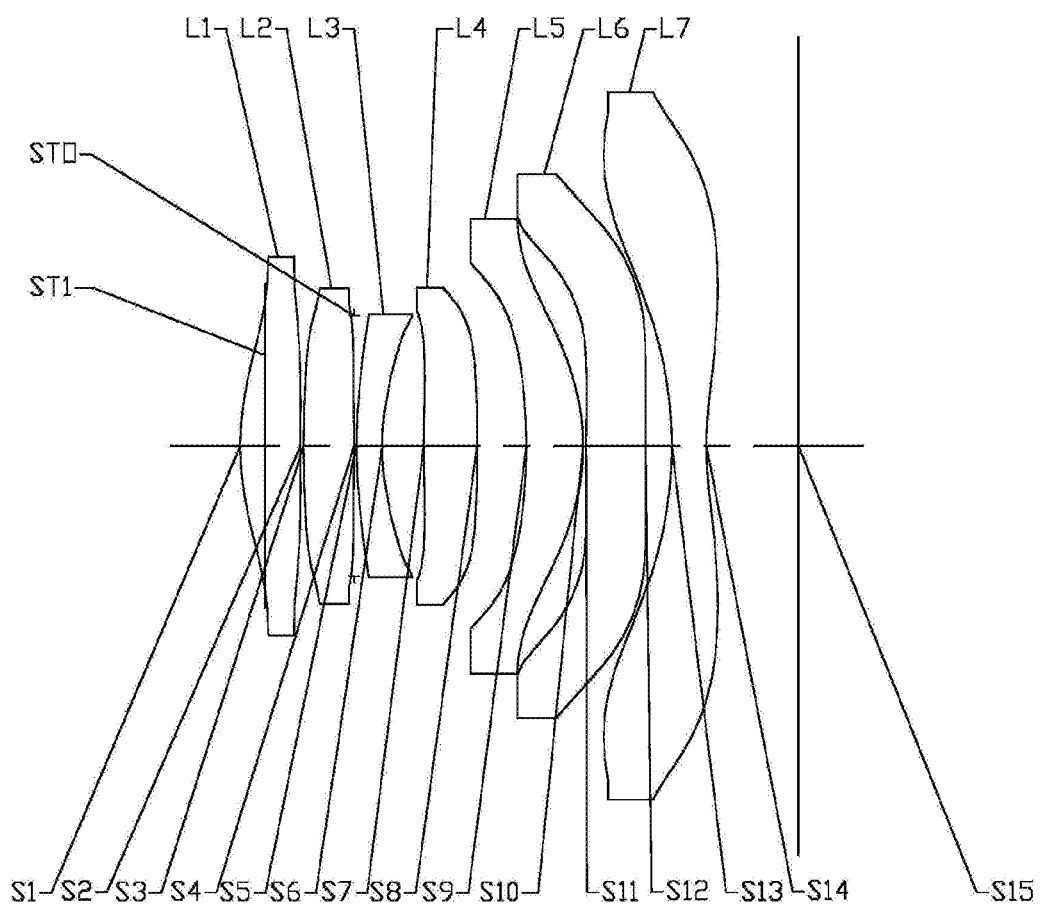
FIG. 1 is a schematic structural diagram illustrating an optical imaging system according to Embodiment 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals refer to the same elements. The expression "and/or" includes any and all combinations of one or more of the associated listed items.

It should be noted that in the present specification, the expressions of the first, the second, etc. are only used to distinguish one feature from another, without indicating any limitations to the features. Thus, the first lens discussed below also could be referred to as the second lens without departing from the teachings of the present disclosure.

In the accompanying drawings, the thickness, size and shape of the lens have been slightly exaggerated for the convenience of explanation. Specifically, shapes of spherical surfaces or aspheric surfaces shown in the accompanying drawings are shown by way of example. That is, shapes of spherical surfaces or aspheric surfaces are not limited to the shapes of the spherical surfaces or the aspheric surfaces shown in the accompanying drawings. The accompanying drawings are merely illustrative and not strictly drawn to scale.

It should be further understood that the terms "comprising," "including," "having" and variants thereof, when used in this specification, specify the presence of stated features, entireties, steps, operations, elements and/or components, but do not exclude the presence or addition of one or more other features, entireties, steps, operations, elements, components and/or combinations thereof. In addition, expressions, such as "at least one of," when preceding a list of features, modify the entire list of features rather than an individual element in the list. Further, the use of "may," when describing implementations of the present disclosure, relates to "one or more implementations of the present disclosure." In addition, the term "exemplary" is intended to refer to an example or illustration.

As used herein, the terms "substantially," "about" and similar terms are used as a term of approximation rather than as a term of degree, and are intended to account for the inherent deviations in measured or calculated values that would be recognized by those of ordinary skill in the art.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, the paraxial area refers to an area near the optical axis. The first lens is the lens closest to the object and the seventh lens is the lens closest to the photosensitive element. Here, the surface closest to the object in each lens is referred to as the object side surface, and the surface closest to the image plane in each lens is referred to as the image side surface.

It should also be noted that the embodiments in the present disclosure and the features in the embodiments may be combined with each other on a non-conflict basis. The present disclosure will be described below in detail with reference to the accompanying drawings and in combination with the embodiments.

The present disclosure will be further described below in combination with specific embodiments.

The optical imaging system according to exemplary implementations of the present disclosure has, for example, seven lenses, i.e., a first lens, a second lens, a third lens, a fourth lens, a fifth lens, a sixth lens and a seventh lens. The seven lenses are arranged in sequence along an optical axis from an object side to an image side. The optical imaging system may have an effective focal length f and an entrance pupil diameter EPD.

According to the exemplary implementations, the third lens may have a negative refractive power. The fifth lens may have a positive refractive power or a negative refractive power, and an image side surface of the fifth lens is a convex surface. The seventh lens may have a positive refractive power or a negative refractive power, and an object side surface of the seventh lens is a concave surface. The first lens, the second lens, the fourth lens, and the sixth lens may respectively have a positive refractive power or a negative refractive power. By properly controlling the positive and negative refractive power distribution of each lens in the system, lower-order aberrations of the system can be effectively balanced and controlled, so that the system obtains a better image quality.

According to the exemplary implementations, a distance TTL from an object side surface of the first lens to an image plane on the optical axis and half of a diagonal length ImgH of an effective pixel area on the image plane of the optical imaging system may satisfy: TTL/ImgH<1.6, and more specifically, may further satisfy: TTL/ImgH≤1.546. By controlling the ratio of the total optical length to the image height of the system, the total size of the optical imaging system can be effectively compressed to realize the ultra-thin characteristic and the miniaturization of the optical imaging system, so that the above optical imaging system can be better applicable to a size-limited system such as systems in portable electronic products.

According to the exemplary implementations, the effective focal length f of the optical imaging system and the entrance pupil diameter EPD of the optical imaging system may satisfy: f/EPD<1.6, and more specifically, may further satisfy: f/EPD≤1.550. Such a configuration can enable the system to have advantages of a large diaphragm and a large aperture in the process of increasing an amount of light admitted, thus reducing an aberration of an edge field of view, and at the same time enhancing an image effect in a dark environment, so that the system has a low sensitivity.

According to the exemplary implementations, a distance SL from an aperture of the optical imaging system to the image plane on the optical axis and the distance TTL from the object side surface of the first lens to the image plane on the optical axis may satisfy: SL/TTL<0.85, and more specifically, may further satisfy: SL/TTL≤0.808. By effectively controlling the total optical length of the system, it is conductive to realizing the miniaturization of the system.

According to the exemplary implementations, a center thickness CT1 of the first lens on the optical axis, a center thickness CT2 of the second lens on the optical axis and a center thickness CT4 of the fourth lens on the optical axis may satisfy: 1.5<(CT1+CT2)/CT4<2.3, and more specifically, may further satisfy: 1.880≤(CT1+CT2)/CT4≤2.140. The ratio, if too large, is not conducive to eliminating the chromatic aberrations of the system. If the ratio is too small, it will result in the overly-thinness of the lenses and a poor technology. Satisfying the above formula can effectively balance the chromatic aberrations of the system and the technology.

According to the exemplary implementations, the center thickness CT2 of the second lens on the optical axis and the center thickness CT4 of the fourth lens on the optical axis may satisfy: 0.75<CT2/CT4<1.5, and more specifically, may further satisfy: 0.794≤CT2/CT4≤1.498. Such a configuration is conductive to distributing the sizes of the lenses evenly, ensuring the assembling stability, reducing aberrations of the overall system and shortening the total length of the optical imaging system.

According to the exemplary implementations, a distance SAG41 from an intersection point of an object side surface of the fourth lens and the optical axis to an effective radius vertex of the object side surface of the fourth lens on the optical axis and a distance SAG42 from an intersection point of an image side surface of the fourth lens and the optical axis to an effective radius vertex of the image side surface of the fourth lens on the optical axis may satisfy: 0<SAG41/SAG42<0.5, and more specifically, may further satisfy: 0.016≤SAG41/SAG42≤0.439. This ratio can reduce the risk of ghost images occurred in the system and effectively balance the size of the system and the technology.

According to the exemplary implementations, a combined focal length f12 of the first lens and the second lens and a combined focal length f56 of the fifth lens and the sixth lens may satisfy: $0.6<f12/f56<1.2$, and more specifically, may further satisfy: $0.796 \leq f12/f56 \leq 1.109$. The ratio, if too large, will cause the fifth lens and the sixth lens to bear too many refractive powers, which results in a poor technology and is not conductive to correcting the aberrations. If the ratio is too small, it will make the calibers of the first lens and the second lens hard to be enlarged, resulting in a poor assembling technology. Satisfying the above formula can effectively ensure the technology and the assembling technology of the lenses.

According to the exemplary implementations, an effective radius DT11 of the object side surface of the first lens and an effective radius DT52 of the image side surface of the fifth lens may satisfy: $0.7<DT11/DT52<1$, and more specifically, may further satisfy: $0.822 \leq DT11/DT52 \leq 0.922$. The ratio, if too large, is not conducive to the miniaturization of the system. If the ratio is too small, it is not conductive to the assembling. The ratio effectively balances the size and the technology of the lens assembly.

According to the exemplary implementations, the half of the diagonal length ImgH of the effective pixel area on the image plane of the optical imaging system and the effective focal length f of the optical imaging system may satisfy: $0.8<ImgH/f<1$, and more specifically, may further satisfy: $0.844 \leq ImgH/f \leq 0.871$. In a system less than 180°, with the same ImgH, a focal length too long means larger negative distortion, and a focal length too short means a poor technology, which is difficult to ensure the brightness of the edge of the image plane. Satisfying the above formula takes into account the distortion, the image quality and the system manufacturability.

According to the exemplary implementations, a spacing distance T34 between the third lens and the fourth lens on the optical axis and a spacing distance T45 between the fourth lens and the fifth lens on the optical axis may satisfy: $0.5<T34/T45<1$, and more specifically, may further satisfy: $0.540 \leq T34/T45 \leq 0.886$. Such a configuration is conductive to ensuring the molding technology and the assembling stability of the lenses.

According to the exemplary implementations, an effective focal length f5 of the fifth lens and an effective focal length f7 of the seventh lens may satisfy: $1.5<|f5/f7|<2.5$, and more specifically, may further satisfy: $1.506 \leq |f5/f7| \leq 2.322$. By properly allocating the refractive powers of the fifth lens and the seventh lens, the aberrations of the overall system can be effectively reduced, and the sensitivity of the system can be effectively lowered.

In application, a radius of curvature of each mirror surface may be optimized. For example, in the exemplary implementations, a radius of curvature R13 of the object side surface of the seventh lens and a radius of curvature R14 of an image side surface of the seventh lens may satisfy: $-1.8<R13/R14<-1$, and more specifically, may further satisfy: $-1.778 \leq R13/R14 \leq -1.099$. Such a configuration is conductive to correcting the chromatic aberrations of the system, and the ratio realizes the balance of various aberrations of the optical imaging system.

In the exemplary implementations, the optical imaging system may further be provided with an aperture STO for limiting the light beam, thereby adjusting the amount of light admitted, and improving the image quality. The optical imaging system according to the above implementations of the present disclosure may use a plurality of lenses, for example, seven lenses described above. By properly allocating the refractive power and surface type of each lens, the center thickness of each lens, axial spacing distances between the lenses, etc., it is possible to effectively enlarge the aperture of the optical imaging system, lower the system sensitivity, ensure the miniaturization of the lens assembly and improve the image quality, thus making the optical imaging system more conducive to producing and processing and applicable to portable electronic products. In the implementations of the present disclosure, at least one of the mirror surfaces of the lenses is an aspheric mirror surface. The characteristic of the aspheric lens is: from the center of the lens to the periphery, the curvature is continuously changing. Unlike the spherical lens with a constant curvature from the center of the lens to the periphery, the aspheric lens has a better radius-of-curvature characteristic, has an advantage of improving a distortion aberration and an astigmatic aberration, and is capable of making the visual field become larger and realistic. Using the aspheric lens, an aberration occurring at the time of imaging can be eliminated as much as possible, thereby improving the image quality. In addition, the use of the aspheric lens can also effectively reduce the number of the lenses in the optical system.

However, it should be understood by those skilled in the art that the various results and advantages described in the Specification may be obtained by changing the number of lenses forming the lens assembly without departing from the technical solution sought to be protected by the present disclosure. For example, although seven lenses are described as an example in the implementations, the optical imaging system is not limited to include seven lenses. If desired, the optical imaging system may also include other numbers of lenses.

Specific embodiments of the optical imaging system that may be applied to the above implementations are further described below with reference to the accompanying drawings.

Embodiment 1

An optical imaging system according to Embodiment 1 of the present disclosure is described below with reference to FIGS. 1 to 2D.

FIG. 1 is a schematic structural diagram illustrating the optical imaging system according to Embodiment 1 of the present disclosure. As shown in FIG. 1, the optical imaging system includes, along an optical axis, seven lenses L1 to L7 arranged in sequence from an object side to an image side. The first lens L1 has an object side surface S1 and an image side surface S2; the second lens L2 has an object side surface S3 and an image side surface S4; the third lens L3 has an object side surface S5 and an image side surface S6; the fourth lens L4 has an object side surface S7 and an image side surface S8; the fifth lens L5 has an object side surface S9 and an image side surface S10; the sixth lens L6 has an object side surface S11 and an image side surface S12; and the seventh lens L7 has an object side surface S13 and an image side surface S14. In this embodiment, the third lens may have a negative refractive power; the fifth lens may optionally have a positive refractive power or a negative refractive power, and the image side surface of the fifth lens is a convex surface; the seventh lens may optionally have a positive refractive power or a negative refractive power, and the object side surface of the seventh lens is a concave surface; and the first lens, the second lens, the fourth lens, and the sixth lens may optionally and respectively have a positive refractive power or a negative refractive power. In the optical imaging system of the present embodiment, an aperture STO for limiting the light beam and provided between the second lens L2 and the third lens L3 is also included. Light from an object successively passes through the surfaces S1 to S14 and is finally imaged on an image plane S15.

Table 1 shows the surface type, the radius of curvature, the thickness, the material and the conic coefficient of each lens of the optical imaging system in Embodiment 1.

TABLE 1

| Surface Number | Surface Type | Radius of Curvature | Thick-ness | Material | | Conic Coefficient |
| | | | | Refractive Index | Abbe Number | |
| --- | --- | --- | --- | --- | --- | --- |
| OBJ | spherical | infinite | infinite | | | |
| ST1 | spherical | infinite | −0.2272 | | | |
| S1 | aspheric | 2.2340 | 0.5567 | 1.546 | 56.11 | −0.1988 |
| S2 | aspheric | 16.9730 | 0.0300 | | | −0.1744 |
| S3 | aspheric | 11.3936 | 0.4654 | 1.546 | 56.11 | 0.0583 |
| S4 | aspheric | −10.4770 | 0.0000 | | | 17.4771 |
| STO | spherical | infinite | 0.0200 | | | |
| S5 | aspheric | 3.9593 | 0.2400 | 1.666 | 20.37 | −0.7145 |
| S6 | aspheric | 1.9403 | 0.3838 | | | 1.2096 |
| S7 | aspheric | 10.4396 | 0.4942 | 1.548 | 53.38 | −0.0961 |
| S8 | aspheric | −21.5320 | 0.4549 | | | 0.0336 |
| S9 | aspheric | −4.2371 | 0.5227 | 1.556 | 47.04 | 0.0000 |
| S10 | aspheric | −1.8258 | 0.0300 | | | −0.1739 |
| S11 | aspheric | 15.3152 | 0.5504 | 1.666 | 20.37 | 0.1080 |
| S12 | aspheric | −32.9581 | 0.2405 | | | −0.0117 |
| S13 | aspheric | −3.1322 | 0.3200 | 1.516 | 56.11 | −0.9757 |
| S14 | aspheric | 2.7023 | 0.8500 | | | −4.2417 |
| S15 | spherical | infinite | | | | |

As can be obtained from Table 1, the center thickness CT1 of the first lens L1 on the optical axis, the center thickness CT2 of the second lens L2 on the optical axis and the center thickness CT4 of the fourth lens L4 on the optical axis satisfy: (CT1+CT2)/CT4=2.068. The center thickness CT2 of the second lens L2 on the optical axis and the center thickness CT4 of the fourth lens L4 on the optical axis satisfy: CT2/CT4=0.942. The radius of curvature R13 of the object side surface S13 of the seventh lens L7 and the radius of curvature R14 of the image side surface S14 of the seventh lens L7 satisfy: R13/R14=−1.159.

In this embodiment, seven lenses are used as an example. By properly allocating the focal length and the surface type of each lens, the aperture of the lens assembly is effectively enlarged, the total length of the lens assembly is shortened, and the large aperture and the miniaturization of the lens assembly are ensured. At the same time, correcting various types of aberrations improves the resolution of the lens assembly and the image quality. The surface type x of each aspheric surface is defined by the following formula:

$$x = \frac{ch^2}{1+\sqrt{1-(k+1)c^2h^2}} + \sum A_i h^i. \quad (1)$$

Here, x is the distance sagittal height to the vertex of the aspheric surface when the aspheric surface is at a position of a height h along the optical axis; c is the paraxial curvature of the aspheric surface, and c=1/r (i.e., the paraxial curvature c is the reciprocal of the radius of curvature R in the above Table 1); k is the conic coefficient (given in the above Table 1); and Ai is the correction coefficient of the $i^{th}$ order of the aspheric surface. Table 2 below shows the higher-order coefficients $A_4$, $A_6$, $A_8$, $A_{10}$, $A_{12}$, $A_{14}$ and $A_{16}$ applicable to the mirror surfaces S1 to S10 in Embodiment 1.

TABLE 2

| Surface Number | A4 | A6 | A8 | A10 | A12 | A14 | A16 |
| --- | --- | --- | --- | --- | --- | --- | --- |
| S1 | −3.3159E−02 | 4.2150E−03 | −3.8349E−02 | 2.2136E−02 | −3.6527E−03 | 0.0000E+00 | 0.0000E+00 |
| S2 | −1.0036E−01 | 7.7591E−02 | −3.7920E−02 | 1.0045E−02 | −8.2398E−04 | 0.0000E+00 | 0.0000E+00 |
| S3 | −3.0798E−02 | 8.7207E−02 | −4.9014E−02 | 3.0724E−02 | −1.6818E−02 | 1.5571E−03 | 6.5540E−04 |
| S4 | 1.7621E−01 | −3.1963E−01 | 3.9710E−01 | −3.8723E−01 | 2.3812E−01 | −7.9721E−02 | 1.1045E−02 |
| S5 | −6.5643E−03 | −1.0020E−01 | 1.6498E−01 | −1.7120E−01 | 1.1011E−01 | −3.2501E−02 | 3.0663E−03 |
| S6 | −1.8186E−01 | 2.4963E−01 | −4.3738E−01 | 5.8029E−01 | −4.9153E−01 | 2.3425E−01 | −4.7048E−02 |
| S7 | −5.1926E−02 | 1.6333E−02 | −7.9360E−02 | 1.2052E−01 | −1.1126E−01 | 4.7291E−02 | −7.0131E−03 |
| S8 | −3.5888E−02 | −2.2347E−02 | 1.4209E−02 | 4.6604E−02 | −2.5628E−02 | 5.6780E−03 | |
| S9 | 7.7707E−03 | −2.3605E−02 | 1.9999E−03 | −7.6956E−04 | −4.9704E−04 | 1.2674E−04 | 7.7229E−05 |
| S10 | −1.8969E−03 | 6.6284E−02 | −9.7368E−02 | 7.9866E−02 | −3.1560E−02 | 5.9656E−03 | −4.3164E−04 |
| S11 | −5.7691E−02 | 2.0152E−02 | −7.9912E−02 | 7.6828E−02 | −3.3453E−02 | 6.9396E−03 | −5.5042E−04 |
| S12 | 6.6745E−02 | −9.6011E−02 | 3.7024E−02 | −5.1167E−03 | −5.9027E−04 | 2.4771E−04 | −1.9553E−05 |
| S13 | 1.9421E−03 | −7.5590E−03 | 4.3976E−03 | −8.1582E−04 | 6.7004E−05 | −2.0986E−06 | 0.0000E+00 |
| S14 | −1.1855E−01 | 5.9067E−02 | −1.8439E−02 | 3.5257E−03 | −4.0693E−04 | 2.5811E−05 | −6.8283E−07 |

Table 3 below shows the effective focal lengths f1 to f7 of the lenses, the total effective focal length f of the optical imaging system, the half of the diagonal length of the effective pixel area on the image plane ImgH of the optical imaging system, the half of the maximum field-of-view angle HFOV of the optical imaging system, the f-number Fno of the optical imaging system and the distance TTL from the object side surface S1 of the first lens L1 to the image plane S15 of the optical imaging system on the optical axis in Embodiment 1.

TABLE 3

| | |
|---|---|
| f1 (mm) | 4.650 |
| f2 (mm) | 10.073 |
| f3 (mm) | −5.994 |
| f4 (mm) | 12.868 |
| f5 (mm) | 5.336 |
| f6 (mm) | 15.762 |
| f7 (mm) | −2.607 |
| f (mm) | 4.111 |
| ImgH | 3.582 |
| HFOV (°) | 40.886/40.9 |
| Fno | 1.55 |
| TTL (mm) | 5.159 |

According to table 3, the distance TTL from the object side surface S1 of the first lens to the image plane S15 on the optical axis and the half of the diagonal length of the effective pixel area on the image plane S15 of the optical imaging system ImgH satisfy: TTL/ImgH=1.440. The half of the diagonal length of the effective pixel area on the image plane S15 of the optical imaging system ImgH and the effective focal length f of the optical imaging system may satisfy: ImgH/f=0.871. The effective focal length f5 of the fifth lens L5 and the effective focal length f7 of the seventh lens L7 satisfy: |f5/f7|=2.047.

In this embodiment, the effective focal length f of the optical imaging system and the entrance pupil diameter EPD of the optical imaging system satisfy: f/EPD=1.549. The distance SL from the aperture STO of the optical imaging system to the image plane S15 on the optical axis and the distance TTL from the object side surface S1 of the first lens L1 to the image plane S15 on the optical axis satisfy: SL/TTL=0.796. The combined focal length f12 of the first lens L1 and the second lens L2 and the combined focal length f56 of the fifth lens L5 and the sixth lens L6 satisfy: f12/f56=0.836. The distance SAG41 from the intersection point of the object side surface S7 of the fourth lens L4 and the optical axis to the effective radius vertex of the object side surface S7 of the fourth lens L4 on the optical axis and the distance SAG42 from the intersection point of the image side surface S8 of the fourth lens L4 and the optical axis to the effective radius vertex of the image side surface S8 of the fourth lens L4 on the optical axis satisfy: SAG41/SAG42=0.208. The effective radius DT11 of the object side surface S1 of the first lens L1 and the effective radius DT52 of the image side surface S10 of the fifth lens L5 satisfy: DT11/DT52=0.831. The spacing distance T34 between the third lens L3 and the fourth lens L4 on the optical axis and the spacing distance T45 between the fourth lens L4 and the fifth lens L5 on the optical axis satisfy: T34/T45=0.844.

Figure 2A:
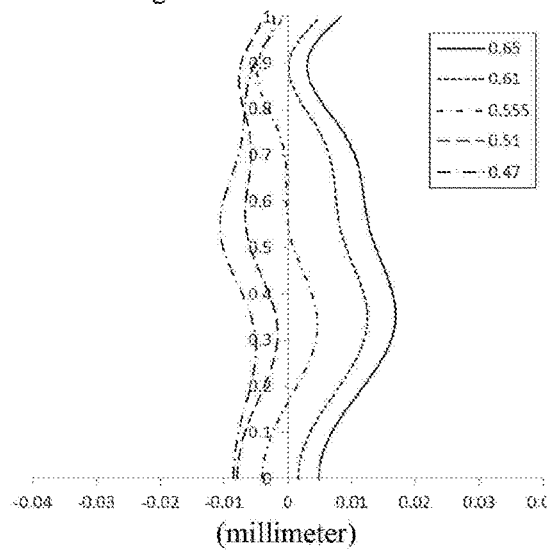
FIG. 2A shows a longitudinal aberration curve of the optical imaging system according to Embodiment 1.
Figure 2B:
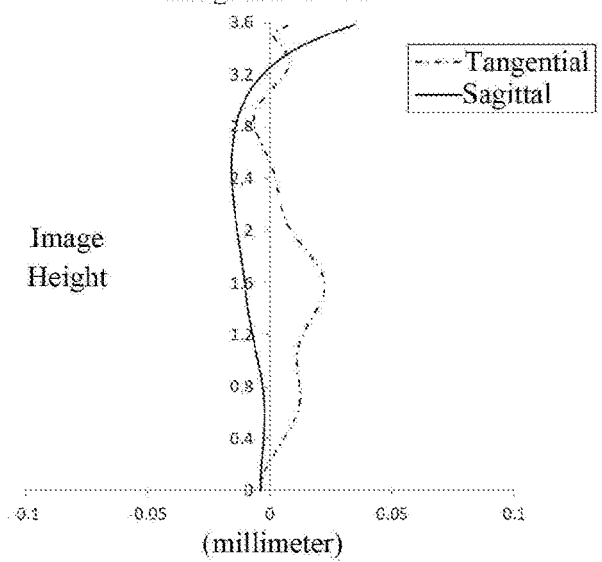
FIG. 2B shows an astigmatic curve of the optical imaging system according to Embodiment 1.
Figure 2C:
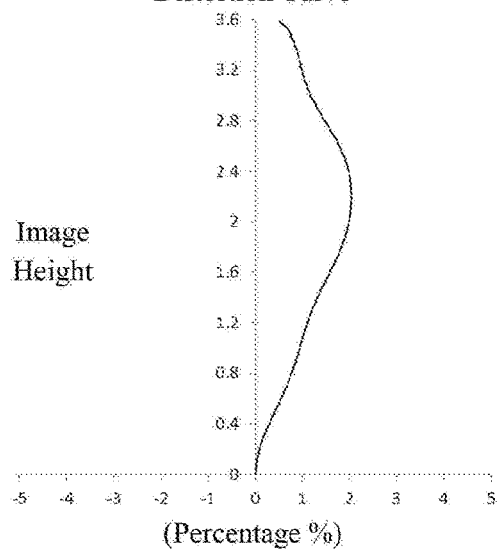
FIG. 2C shows a distortion curve of the optical imaging system according to Embodiment 1.
Figure 2D:
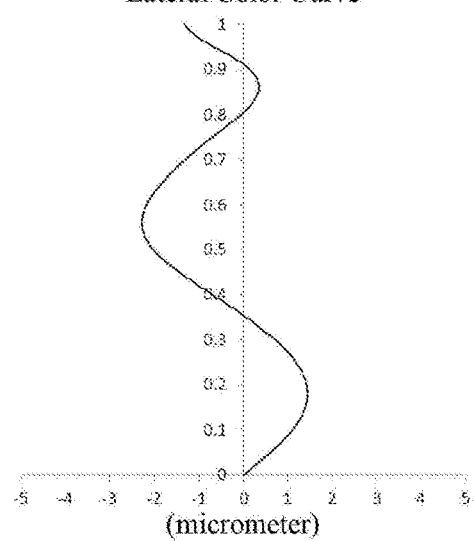
FIG. 2D shows a lateral color curve of the optical imaging system according to Embodiment 1.

FIG. 2A shows a longitudinal aberration curve of the optical imaging system according to Embodiment 1, representing deviations of focal points of light of different wavelengths converged after passing through the optical imaging system. FIG. 2B shows an astigmatic curve of the optical imaging system according to Embodiment 1, representing a curvature of a tangential image plane and a curvature of a sagittal image plane. FIG. 2C shows a distortion curve of the optical imaging system according to Embodiment 1, representing amounts of distortion at different viewing angles. FIG. 2D shows a lateral color curve of the optical imaging system according to Embodiment 1, representing deviations of different image heights on an image plane after light passes through the optical imaging system. It can be seen from FIGS. 2A to 2D that the optical imaging system according to Embodiment 1 can achieve a good image quality.

Embodiment 2

An optical imaging system according to Embodiment 2 of the present disclosure is described below with reference to FIGS. 3 to 4D. In addition to parameters of the lenses of the optical imaging system, for example, in addition to the radius of curvature, the thickness, the conic coefficient, the effective focal length and the axial spacing distance of each lens, and the higher-order coefficients of the mirror surfaces, the optical imaging system described in the present Embodiment 2 and the following embodiments is the same in arrangement and structure as the optical imaging system described in Embodiment 1. For the purpose of brevity, the description of parts similar to those in Embodiment 1 will be omitted.

Figure 3:
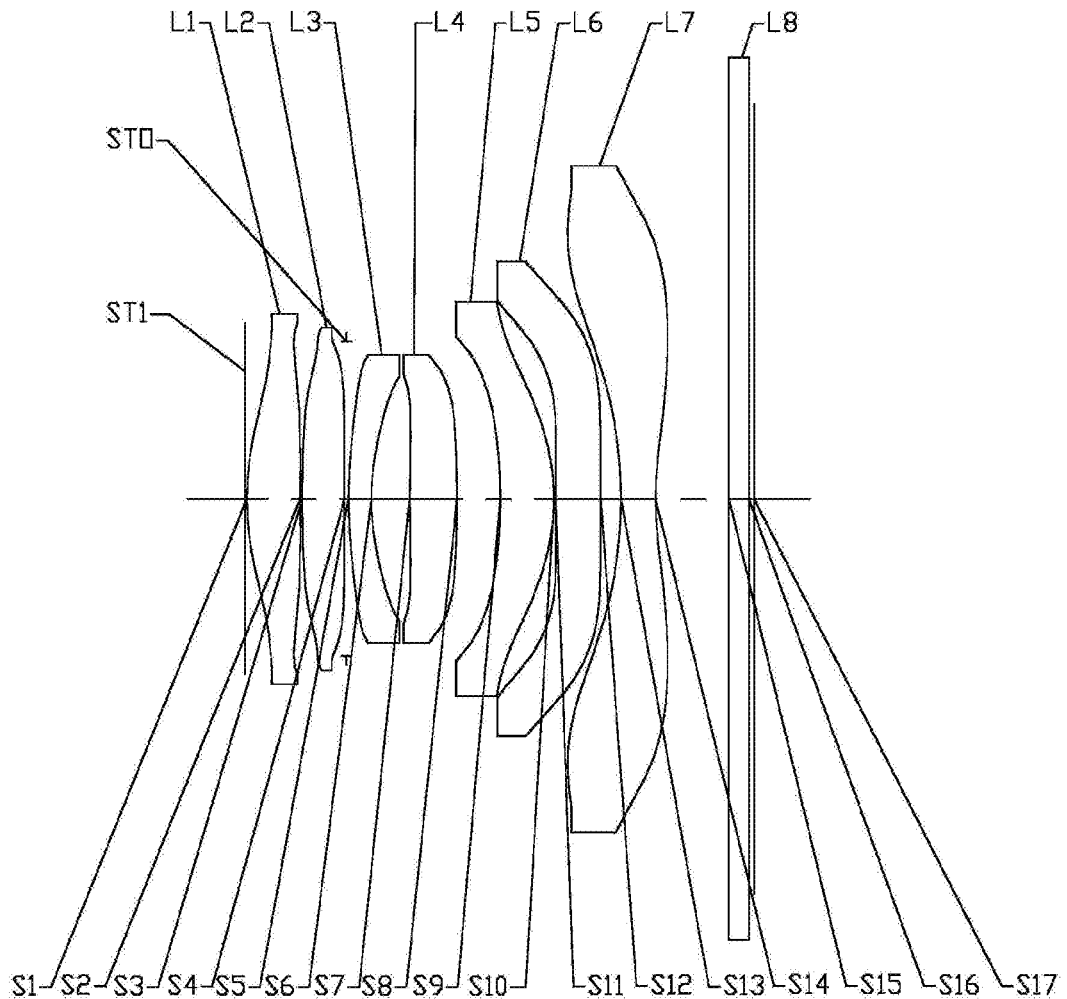
FIG. 3 is a schematic structural diagram illustrating an optical imaging system according to Embodiment 2 of the present disclosure.

FIG. 3 shows a schematic structural diagram of the optical imaging system according to Embodiment 2 of the present disclosure. As shown in FIG. 3, the optical imaging system according to Embodiment 2 includes first to seventh lenses L1-L7 respectively having an object side surface and an image side surface. The optical imaging system according to Embodiment 2 may include a filter L8 having an object side surface S15 and an image side surface S16, and the filter L8 may be used to correct a chromatic aberration. Light from an object successively passes through the surfaces S1 to S16 and is finally imaged on an image plane S17.

Table 4 shows the surface type, the radius of curvature, the thickness, the material and the conic coefficient of each lens of the optical imaging system in Embodiment 2. Table 5 shows the higher-order coefficients of each aspheric mirror surface in Embodiment 2. Table 6 shows the effective focal lengths f1 to f7 of the lenses, the total effective focal length f of the optical imaging system, the half of the diagonal length of the effective pixel area on the image plane ImgH of the optical imaging system, the half of the maximum field-of-view angle HFOV of the optical imaging system, the f-number Fno of the optical imaging system and the distance TTL from the object side surface S1 of the first lens L1 to the image plane S17 of the optical imaging system on the optical axis in Embodiment 2. Here, the respective aspheric surface types may be defined by the formula (1) given in the above Embodiment 1.

TABLE 4

| Surface Number | Surface Type | Radius of Curvature | Thickness | Material Refractive Index | Abbe Number | Conic Coefficient |
|---|---|---|---|---|---|---|
| OBJ | spherical | infinite | infinite | | | |
| ST1 | spherical | infinite | −0.2000 | | | |
| S1 | aspheric | 2.2446 | 0.5553 | 1.546 | 56.11 | −0.2010 |
| S2 | aspheric | 18.3608 | 0.0234 | | | −12.3568 |
| S3 | aspheric | 11.4867 | 0.4404 | 1.546 | 56.11 | 1.6985 |
| S4 | aspheric | −11.4458 | 0.0200 | | | 15.0379 |
| STO | spherical | infinite | 0.0200 | | | |
| S5 | aspheric | 3.8702 | 0.2400 | 1.666 | 20.37 | −0.3894 |
| S6 | aspheric | 1.9354 | 0.3989 | | | 1.2054 |
| S7 | aspheric | 12.1348 | 0.4949 | 1.532 | 51.65 | 15.5483 |
| S8 | aspheric | −15.0024 | 0.4505 | | | −48.6026 |
| S9 | aspheric | −4.1451 | 0.5589 | 1.583 | 42.58 | 0.0000 |
| S10 | aspheric | −1.8276 | 0.0200 | | | −0.1751 |
| S11 | aspheric | 18.8668 | 0.4686 | 1.666 | 20.37 | −18.0548 |
| S12 | aspheric | −27.6644 | 0.2105 | | | 50.6941 |
| S13 | aspheric | −3.4925 | 0.3600 | 1.546 | 56.11 | −0.8537 |
| S14 | aspheric | 2.6003 | 0.7662 | | | −3.8107 |
| S15 | spherical | infinite | 0.2100 | 1.516 | 56.11 | |
| S16 | spherical | infinite | 0.0513 | | | |
| S17 | spherical | infinite | | | | |

TABLE 5

| Surface Number | A4 | A6 | A8 | A10 | A12 | A14 | A16 |
|---|---|---|---|---|---|---|---|
| S1 | −3.2744E−02 | 5.2795E−03 | −4.0845E−02 | 2.3395E−02 | −3.7972E−03 | 0.0000E+00 | 0.0000E+00 |
| S2 | −1.0276E−01 | 8.0930E−02 | −4.1140E−02 | 1.1343E−02 | −9.2288E−04 | 0.0000E+00 | 0.0000E+00 |
| S3 | −3.0318E−02 | 8.5611E−02 | −4.5254E−02 | 2.5016E−02 | −1.3134E−02 | 6.8995E−04 | 7.1454E−04 |
| S4 | 1.7198E−01 | −3.0749E−01 | 3.7568E−01 | −3.5768E−01 | 2.1400E−01 | −6.9660E−02 | 9.3903E−03 |
| S5 | 5.1565E−03 | −1.3411E−01 | 1.9716E−01 | −1.7668E−01 | 1.0342E−01 | −2.9897E−02 | 3.0968E−03 |
| S6 | −1.5515E−01 | 1.7176E−01 | −3.0974E−01 | 4.3068E−01 | −3.6927E−01 | 1.7425E−01 | −3.4166E−02 |
| S7 | −3.9879E−02 | −5.4190E−04 | −5.3243E−02 | 9.1570E−02 | −9.3519E−02 | 4.1796E−02 | −6.3416E−03 |
| S8 | −2.8816E−02 | −4.4221E−02 | 7.3521E−02 | −1.3197E−01 | 1.1686E−01 | −5.4277E−02 | 1.0384E−02 |
| S9 | 4.4885E−03 | −2.2993E−02 | 2.1724E−03 | −7.9266E−04 | −5.1539E−04 | 1.2674E−04 | 7.7229E−05 |
| S10 | 6.1058E−03 | 4.4430E−02 | −7.2505E−02 | 6.4463E−02 | −2.6071E−02 | 4.9226E−03 | −3.5114E−04 |
| S11 | −5.6433E−02 | 1.0190E−02 | −7.9295E−02 | 8.3119E−02 | −3.7696E−02 | 8.0404E−03 | −6.5164E−04 |
| S12 | 5.9374E−02 | −9.2210E−02 | 3.1418E−02 | −8.7620E−04 | −2.2020E−03 | 5.4416E−04 | −4.0327E−05 |
| S13 | 2.9031E−03 | −9.1316E−03 | 5.1819E−03 | −9.9623E−04 | 8.6355E−05 | −2.8932E−06 | 0.0000E+00 |
| S14 | −1.1045E−01 | 5.2874E−02 | −1.6298E−02 | 3.1585E−03 | −3.7700E−04 | 2.5025E−05 | −6.9702E−07 |

TABLE 6

| | |
|---|---|
| f1 (mm) | 4.628 |
| f2 (mm) | 10.573 |
| f3 (mm) | −6.112 |
| f4 (mm) | 12.657 |
| f5 (mm) | 5.129 |
| f6 (mm) | 16.899 |
| f7 (mm) | −2.674 |
| f (mm) | 4.215 |
| ImgH | 3.582 |
| HFOV (°) | 39.740/39.7 |
| Fno | 1.55 |
| TTL (mm) | 5.289 |

Figure 4A:
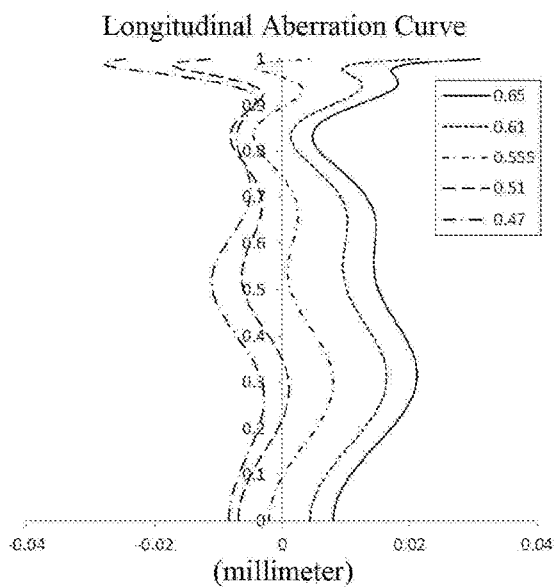
FIG. 4A shows a longitudinal aberration curve of the optical imaging system according to Embodiment 2.
Figure 4B:
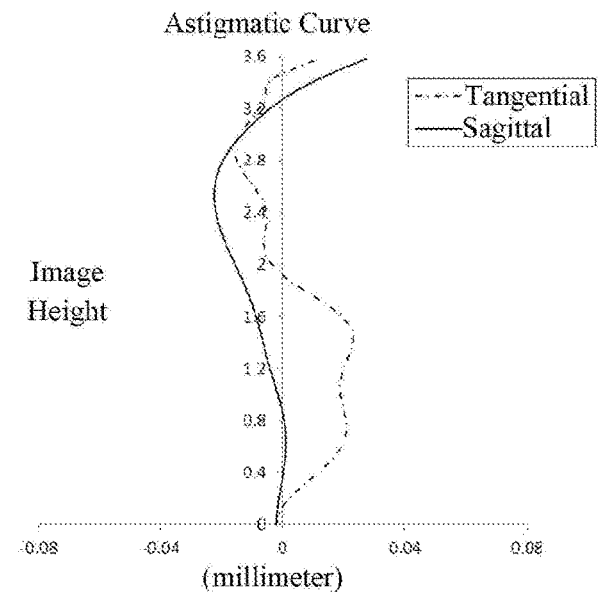
FIG. 4B shows an astigmatic curve of the optical imaging system according to Embodiment 2.
Figure 4C:
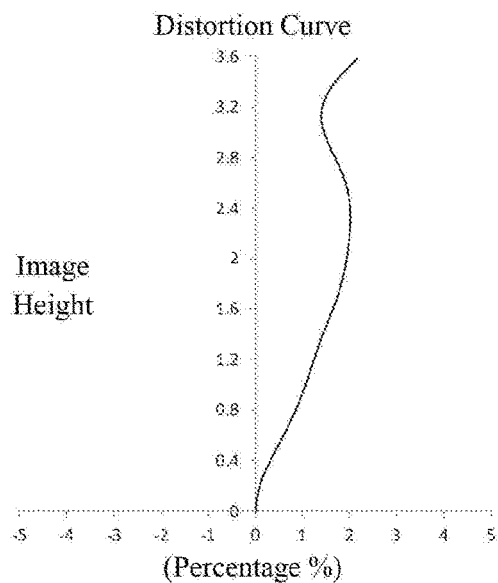
FIG. 4C shows a distortion curve of the optical imaging system according to Embodiment 2.
Figure 4D:
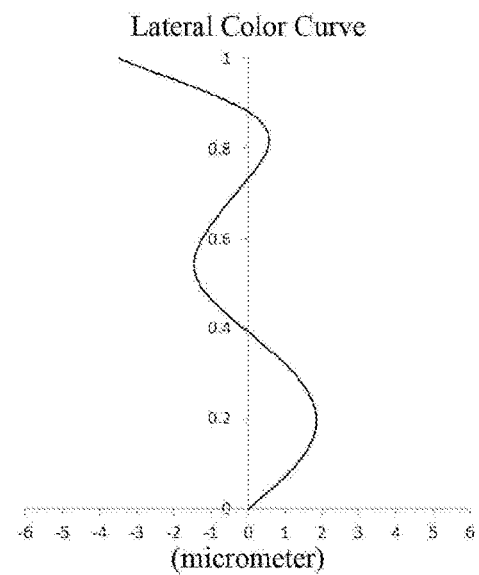
FIG. 4D shows a lateral color curve of the optical imaging system according to Embodiment 2.

FIG. 4A shows a longitudinal aberration curve of the optical imaging system according to Embodiment 2, representing deviations of focal points of light of different wavelengths converged after passing through the optical imaging system. FIG. 4B shows an astigmatic curve of the optical imaging system according to Embodiment 2, representing a curvature of a tangential image plane and a curvature of a sagittal image plane. FIG. 4C shows a distortion curve of the optical imaging system according to Embodiment 2, representing amounts of distortion at different viewing angles. FIG. 4D shows a lateral color curve of the optical imaging system according to Embodiment 2, representing deviations of different image heights on an image plane after light passes through the optical imaging system. It can be seen from FIGS. 4A to 4D that the optical imaging system according to Embodiment 2 can achieve a good image quality.

Embodiment 3

An optical imaging system according to Embodiment 3 of the present disclosure is described below with reference to FIGS. 5 to 6D.

Figure 5:
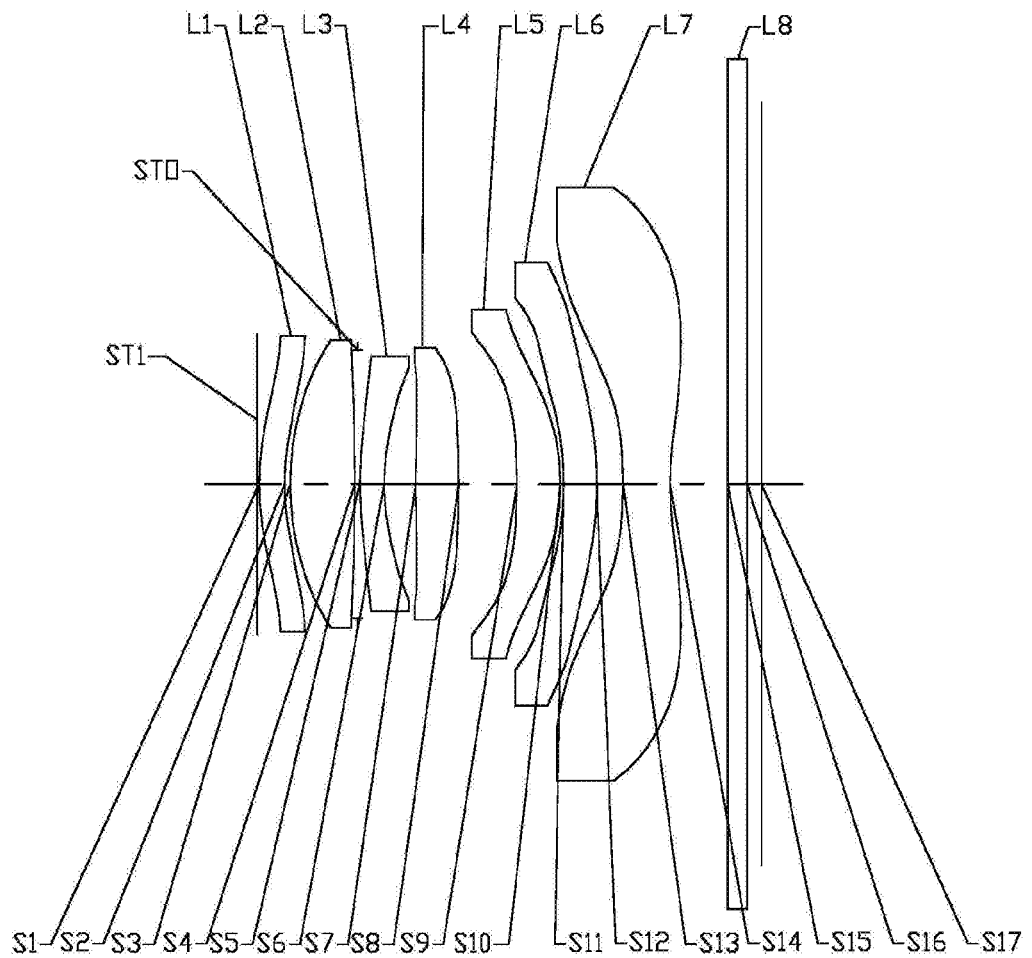
FIG. 5 is a schematic structural diagram illustrating an optical imaging system according to Embodiment 3 of the present disclosure.

FIG. 5 shows a schematic structural diagram of the optical imaging system according to Embodiment 3 of the present disclosure. As shown in FIG. 5, the optical imaging system according to Embodiment 3 includes first to seventh lenses L1-L7 respectively having an object side surface and an image side surface. The optical imaging system according to Embodiment 3 may include a filter L8 having an object side surface S15 and an image side surface S16, and the filter L8 may be used to correct a chromatic aberration. Light from an object successively passes through the surfaces S1 to S16 and is finally imaged on an image plane S17.

Table 7 shows the surface type, the radius of curvature, the thickness, the material and the conic coefficient of each lens of the optical imaging system in Embodiment 3. Table 8 shows the higher-order coefficients of each aspheric mirror surface in Embodiment 3. Table 9 shows the effective focal lengths f1 to f7 of the lenses, the total effective focal length f of the optical imaging system, the half of the diagonal length of the effective pixel area on the image plane ImgH of the optical imaging system, the half of the maximum field-of-view angle HFOV of the optical imaging system, the f-number Fno of the optical imaging system and the distance TTL from the object side surface S1 of the first lens L1 to the image plane S17 of the optical imaging system on the optical axis in Embodiment 3. Here, the respective aspheric surface types may be defined by the formula (1) given in the above Embodiment 1.

TABLE 7

| Surface Number | Surface Type | Radius of Curvature | Thickness | Material Refractive Index | Abbe Number | Conic Coefficient |
|---|---|---|---|---|---|---|
| OBJ | spherical | infinite | infinite | | | |
| ST1 | spherical | infinite | 0.0210 | | | |
| S1 | aspheric | 2.2624 | 0.2776 | 1.546 | 56.11 | −3.3472 |
| S2 | aspheric | 2.1499 | 0.0589 | | | −9.6960 |
| S3 | aspheric | 2.2727 | 0.6987 | 1.546 | 56.11 | −16.5988 |
| S4 | aspheric | −24.6594 | 0.0324 | | | 81.5107 |
| STO | spherical | infinite | 0.0216 | | | |
| S5 | aspheric | 3.3503 | 0.2640 | 1.666 | 20.37 | −14.2896 |
| S6 | aspheric | 2.0603 | 0.3395 | | | 1.0837 |
| S7 | aspheric | 12.9311 | 0.4663 | 1.739 | 44.08 | −70.1424 |
| S8 | aspheric | −12.2151 | 0.6287 | | | −103.0352 |
| S9 | aspheric | −5.4406 | 0.4695 | 1.744 | 44.85 | 0.0000 |
| S10 | aspheric | −2.1211 | 0.0344 | | | −0.2949 |
| S11 | aspheric | −3.4386 | 0.3579 | 1.666 | 20.37 | −21.2180 |
| S12 | aspheric | −3.7282 | 0.2857 | | | −0.1711 |
| S13 | aspheric | −4.4546 | 0.5076 | 1.546 | 56.11 | −0.1086 |
| S14 | aspheric | 2.5055 | 0.6204 | | | −12.8463 |
| S15 | spherical | infinite | 0.2100 | 1.516 | 56.11 | |
| S16 | spherical | infinite | 0.1575 | | | |
| S17 | spherical | infinite | | | | |

TABLE 8

| Surface Number | A4 | A6 | A8 | A10 | A12 | A14 | A16 |
|---|---|---|---|---|---|---|---|
| S1 | −5.8149E−04 | −3.6399E−02 | 1.2644E−02 | −1.0019E−03 | −2.3813E−04 | 0.0000E+00 | 0.0000E+00 |
| S2 | 5.4739E−02 | −1.2562E−01 | 9.5557E−02 | −3.5476E−02 | 5.0059E−03 | 0.0000E+00 | 0.0000E+00 |
| S3 | 1.3703E−01 | −1.2273E−01 | 5.9549E−02 | 3.9948E−02 | −6.2921E−02 | 2.8309E−02 | −4.5090E−03 |
| S4 | −3.8046E−02 | 1.4995E−01 | −2.7643E−01 | 2.8481E−01 | −1.7406E−01 | 5.9991E−02 | −8.9873E−03 |
| S5 | −5.9733E−02 | 2.0010E−01 | −4.1470E−01 | 4.7036E−01 | −3.2122E−01 | 1.2845E−01 | −2.3128E−02 |
| S6 | −8.6379E−02 | 5.8184E−02 | 8.8610E−04 | −1.7473E−01 | 2.6430E−01 | −1.6146E−01 | 3.7175E−02 |
| S7 | −1.9476E−02 | −9.5634E−03 | 6.2008E−02 | −1.7552E−01 | 2.2008E−01 | −1.4177E−01 | 3.6954E−02 |
| S3 | −3.9362E−02 | −2.6720E−02 | 4.0196E−02 | −6.0524E−02 | 4.4477E−02 | −1.9043E−02 | 3.6563E−03 |
| S9 | −4.3413E−02 | −4.5231E−02 | 8.8334E−03 | 4.6526E−03 | 5.6221E−04 | −8.0267E−04 | 7.9569E−05 |
| S10 | −1.8526E−01 | 3.2923E−01 | −3.0329E−01 | 1.5996E−01 | −4.3194E−02 | 5.0302E−03 | −1.2724E−04 |
| S11 | −3.4748E−01 | 5.5412E−01 | −4.3913E−01 | 2.0916E−01 | −6.1602E−02 | 1.0120E−02 | −6.9687E−04 |
| S12 | −6.7169E−02 | 7.8038E−02 | −2.5796E−02 | 1.5080E−03 | 8.2932E−04 | −1.8008E−04 | 1.1845E−05 |
| S13 | −1.4705E−01 | 8.0529E−02 | −2.0233E−02 | 3.1515E−03 | −3.0959E−04 | 1.4520E−05 | 0.0000E+00 |
| S14 | −6.2701E−02 | 2.5425E−02 | −7.5540E−03 | 1.4140E−03 | −1.7314E−04 | 1.3035E−05 | −4.5699E−07 |

TABLE 9

| f1 (mm) | −615.542 |
| f2 (mm) | 3.847 |
| f3 (mm) | −8.745 |
| f4 (mm) | 8.529 |
| f5 (mm) | 4.388 |
| f6 (mm) | −131.285 |
| f7 (mm) | −2.863 |
| f (mm) | 4.197 |

TABLE 9-continued

| ImgH | 3.582 |
| HFOV (°) | 39.831/39.8 |
| Fno | 1.55 |
| TTL (mm) | 5.431 |

Figure 6A:
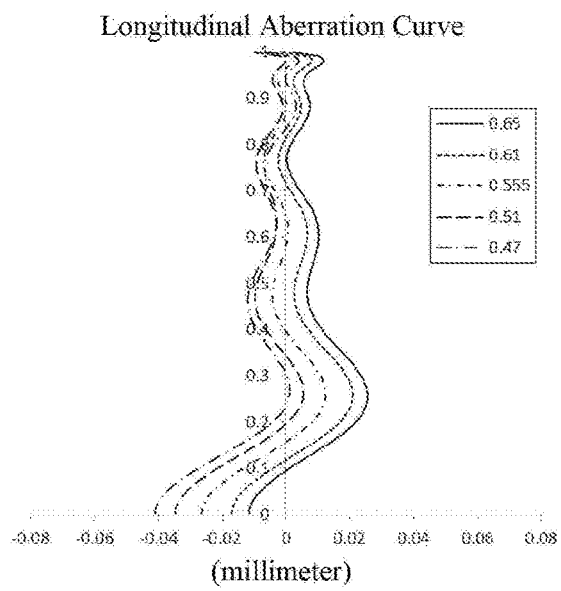
FIG. 6A shows a longitudinal aberration curve of the optical imaging system according to Embodiment 3.
Figure 6B:
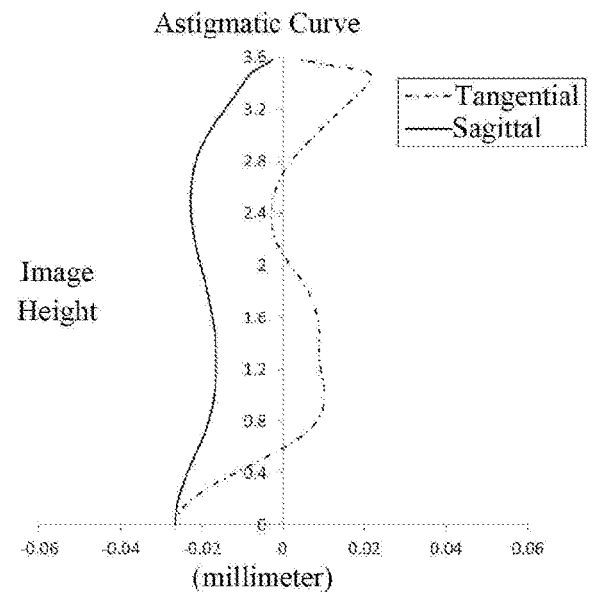
FIG. 6B shows an astigmatic curve of the optical imaging system according to Embodiment 3.
Figure 6C:
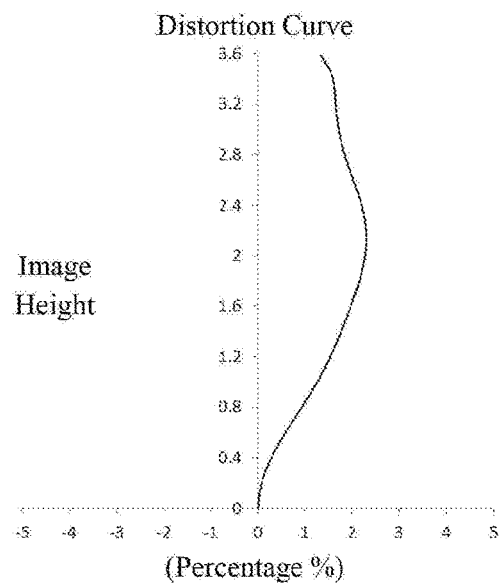
FIG. 6C shows a distortion curve of the optical imaging system according to Embodiment 3.
Figure 6D:
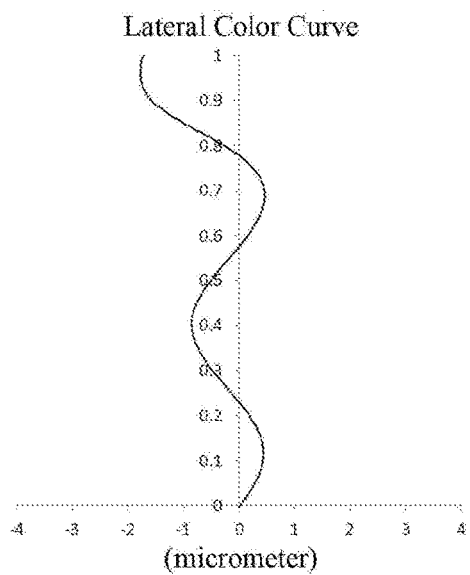
FIG. 6D shows a lateral color curve of the optical imaging system according to Embodiment 3.

FIG. 6A shows a longitudinal aberration curve of the optical imaging system according to Embodiment 3, representing deviations of focal points of light of different wavelengths converged after passing through the optical imaging system. FIG. 6B shows an astigmatic curve of the optical imaging system according to Embodiment 3, representing a curvature of a tangential image plane and a curvature of a sagittal image plane. FIG. 6C shows a distortion curve of the optical imaging system according to Embodiment 3, representing amounts of distortion at different viewing angles. FIG. 6D shows a lateral color curve of the optical imaging system according to Embodiment 3, representing deviations of different image heights on an image plane after light passes through the optical imaging system. It can be seen from FIGS. 6A to 6D that the optical imaging system according to Embodiment 3 can achieve a good image quality.

Embodiment 4

An optical imaging system according to Embodiment 4 of the present disclosure is described below with reference to FIGS. 7 to 8D.

Figure 7:
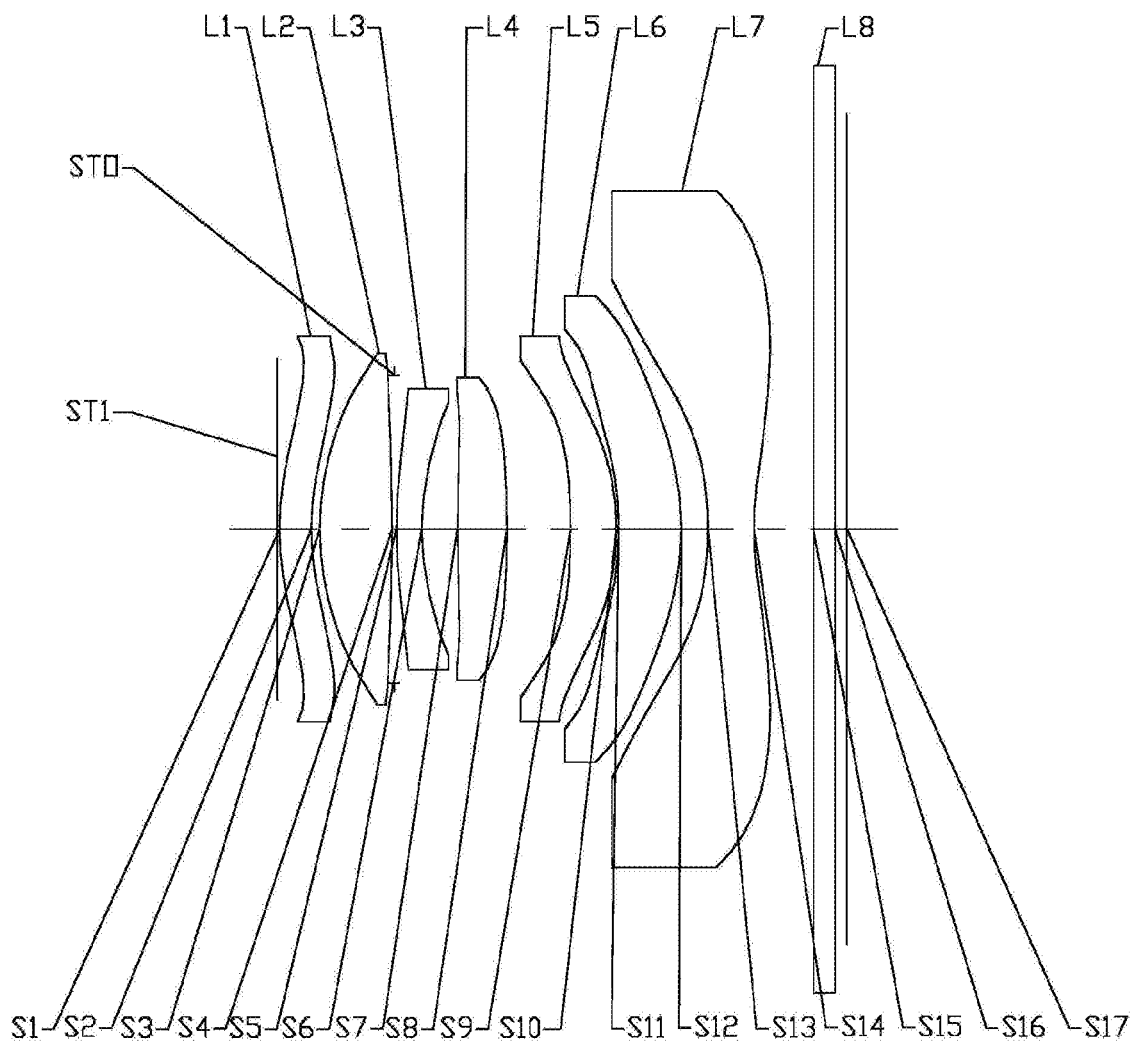
FIG. 7 is a schematic structural diagram illustrating an optical imaging system according to Embodiment 4 of the present disclosure.

FIG. 7 shows a schematic structural diagram of the optical imaging system according to Embodiment 4 of the present disclosure. As shown in FIG. 7, the optical imaging system according to Embodiment 4 includes first to seventh lenses L1-L7 respectively having an object side surface and an image side surface. The optical imaging system according to Embodiment 4 may include a filter L8 having an object side surface S15 and an image side surface S16, and the filter L8 may be used to correct a chromatic aberration. Light from an object successively passes through the surfaces S1 to S16 and is finally imaged on an image plane S17.

Table 10 shows the surface type, the radius of curvature, the thickness, the material and the conic coefficient of each lens of the optical imaging system in Embodiment 4. Table 11 shows the higher-order coefficients of each aspheric mirror surface in Embodiment 4. Table 12 shows the effective focal lengths f1 to f7 of the lenses, the total effective focal length f of the optical imaging system, the half of the diagonal length of the effective pixel area on the image plane ImgH of the optical imaging system, the half of the maximum field-of-view angle HFOV of the optical imaging system, the f-number Fno of the optical imaging system and the distance TTL from the object side surface S1 of the first lens L1 to the image plane S17 of the optical imaging system on the optical axis in Embodiment 4. Here, the respective aspheric surface types may be defined by the formula (1) given in the above Embodiment 1.

TABLE 10

| Surface Number | Surface Type | Radius of Curvature | Thickness | Refractive Index | Abbe Number | Conic Coefficient |
|---|---|---|---|---|---|---|
| OBJ | spherical | infinite | infinite | | | |
| ST1 | spherical | infinite | 0.0210 | | | |
| S1 | aspheric | 2.2934 | 0.3087 | 1.546 | 56.11 | −3.3258 |
| S2 | aspheric | 2.0020 | 0.0822 | | | −9.6350 |
| S3 | aspheric | 2.1176 | 0.7083 | 1.546 | 56.11 | −16.0865 |
| S4 | aspheric | −19.5471 | 0.0200 | | | 3.1693 |
| STO | spherical | infinite | 0.0200 | | | |
| S5 | aspheric | 3.4003 | 0.2500 | 1.666 | 20.37 | −15.6615 |
| S6 | aspheric | 2.0756 | 0.3484 | | | 1.0639 |
| S7 | aspheric | 12.4313 | 0.4794 | 1.695 | 49.34 | −33.7449 |
| S8 | aspheric | −11.3947 | 0.6230 | | | −133.3738 |
| S9 | aspheric | −5.0016 | 0.4480 | 1.728 | 46.11 | 0.0000 |
| S10 | aspheric | −2.2648 | 0.0200 | | | −0.2205 |
| S11 | aspheric | −3.6062 | 0.6107 | 1.546 | 56.11 | −18.7798 |
| S12 | aspheric | −2.2955 | 0.2632 | | | −0.3192 |
| S13 | aspheric | −2.6931 | 0.4500 | 1.546 | 56.11 | −0.3933 |
| S14 | aspheric | 2.4503 | 0.5792 | | | −13.6396 |
| S15 | spherical | infinite | 0.2100 | 1.516 | 56.11 | |
| S16 | spherical | infinite | 0.1163 | | | |
| S17 | spherical | infinite | | | | |

TABLE 11

| Surface Number | A4 | A6 | A8 | A10 | A12 | A14 | A16 |
|---|---|---|---|---|---|---|---|
| S1 | −1.5643E−02 | −1.0490E−02 | −2.6942E−03 | 3.4237E−03 | −8.1079E−04 | 0.0000E+00 | 0.0000E+00 |
| S2 | 5.3634E−02 | −1.2585E−01 | 9.7778E−02 | −3.6595E−02 | 5.0409E−03 | 0.0000E+00 | 0.0000E+00 |
| S3 | 1.6921E−01 | −2.3324E−01 | 2.5252E−01 | −1.7325E−01 | 7.8611E−02 | −2.1592E−02 | 2.5917E−03 |
| S4 | −2.9663E−02 | 9.6428E−02 | −1.6870E−01 | 1.6971E−01 | −9.5764E−02 | 2.8616E−02 | −3.5841E−03 |
| S5 | −4.9737E−02 | 1.2067E−01 | −2.3864E−01 | 2.7159E−01 | −1.8133E−01 | 6.6603E−02 | −1.0419E−02 |
| S6 | −8.3288E−02 | 2.8844E−02 | 3.8419E−02 | −1.5165E−01 | 1.8822E−01 | −1.0866E−01 | 2.4611E−02 |
| S7 | −1.6402E−02 | −6.5879E−03 | 2.9325E−02 | −9.3314E−02 | 1.2163E−01 | −7.9098E−02 | 2.0197E−02 |
| S8 | −3.7392E−02 | −3.8382E−02 | 7.4534E−02 | −1.1562E−01 | 9.4542E−02 | −4.1199E−02 | 7.3555E−03 |
| S9 | −4.0207E−02 | −4.4159E−02 | 9.2073E−02 | 4.7940E−03 | 6.2239E−04 | −7.7394E−04 | 8.0012E−05 |
| S10 | −1.7307E−01 | 2.6742E−01 | −2.1281E−01 | 1.0100E−01 | −2.5576E−02 | 2.9796E−03 | −9.8755E−05 |
| S11 | −3.1439E−01 | 4.4473E−01 | −2.9798E−01 | 1.1137E−01 | −2.2863E−02 | 1.8280E−03 | 4.3976E−05 |
| S12 | 8.6891E−03 | −8.8681E−04 | 4.5870E−03 | 6.2987E−04 | −1.4274E−03 | 3.6685E−04 | −2.8410E−05 |
| S13 | −7.3882E−02 | 3.2655E−02 | −4.5719E−03 | 2.2544E−04 | −3.4911E−06 | 5.5681E−07 | 0.0000E+00 |
| S14 | −4.3626E−02 | 1.5312E−02 | −3.6665E−03 | 5.0867E−04 | −3.9599E−05 | 1.4485E−06 | −1.4827E−08 |

TABLE 12

| | |
|---|---|
| f1 (mm) | −46.106 |
| f2 (mm) | 3.541 |
| f3 (mm) | −8.646 |
| f4 (mm) | 8.596 |
| f5 (mm) | 5.293 |
| f6 (mm) | 9.934 |
| f7 (mm) | −2.280 |
| f (mm) | 4.200 |
| ImgH | 3.582 |
| HFOV (°) | 39.751/39.8 |
| Fno | 1.55 |
| TTL (mm) | 5.537 |

Figure 8A:
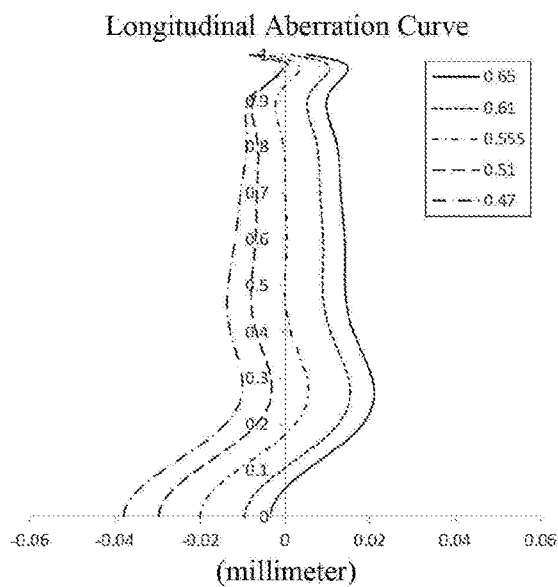
FIG. 8A shows a longitudinal aberration curve of the optical imaging system according to Embodiment 4.
Figure 8B:
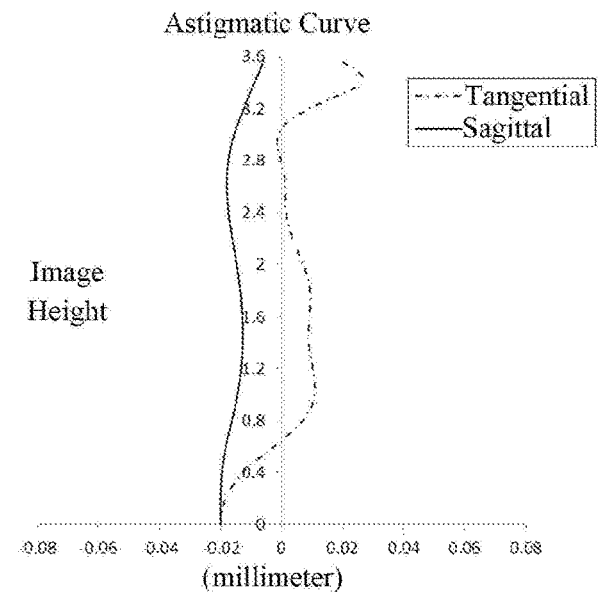
FIG. 8B shows an astigmatic curve of the optical imaging system according to Embodiment 4.
Figure 8C:
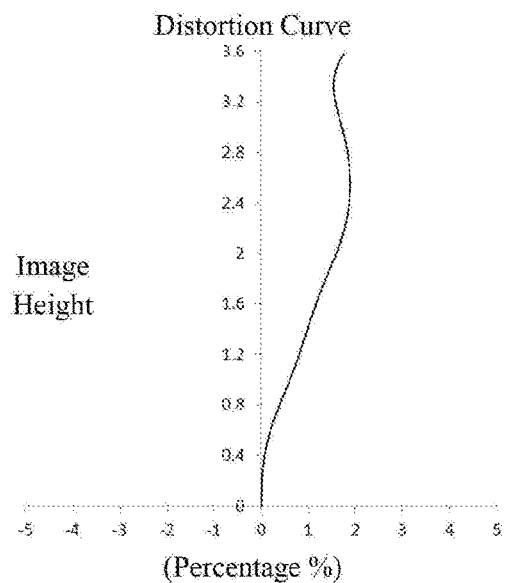
FIG. 8C shows a distortion curve of the optical imaging system according to Embodiment 4.
Figure 8D:
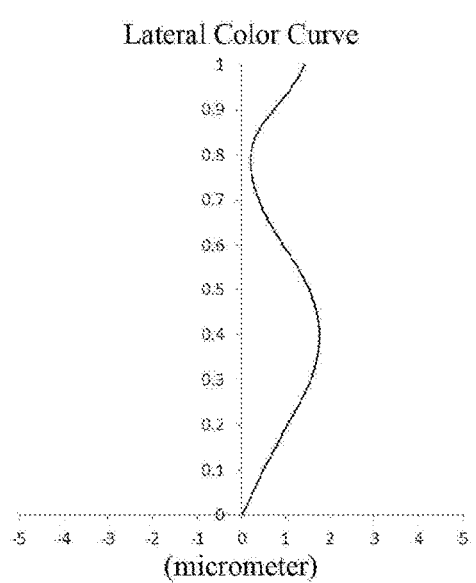
FIG. 8D shows a lateral color curve of the optical imaging system according to Embodiment 4.

FIG. 8A shows a longitudinal aberration curve of the optical imaging system according to Embodiment 4, representing deviations of focal points of light of different wavelengths converged after passing through the optical imaging system. FIG. 8B shows an astigmatic curve of the optical imaging system according to Embodiment 4, representing a curvature of a tangential image plane and a curvature of a sagittal image plane. FIG. 8C shows a distortion curve of the optical imaging system according to Embodiment 4, representing amounts of distortion at different viewing angles. FIG. 8D shows a lateral color curve of the optical imaging system according to Embodiment 4, representing deviations of different image heights on an image plane after light passes through the optical imaging system. It can be seen from FIGS. 8A to 8D that the optical imaging system according to Embodiment 4 can achieve a good image quality.

Embodiment 5

An optical imaging system according to Embodiment 5 of the present disclosure is described below with reference to FIGS. 9 to 10D.

Figure 9:
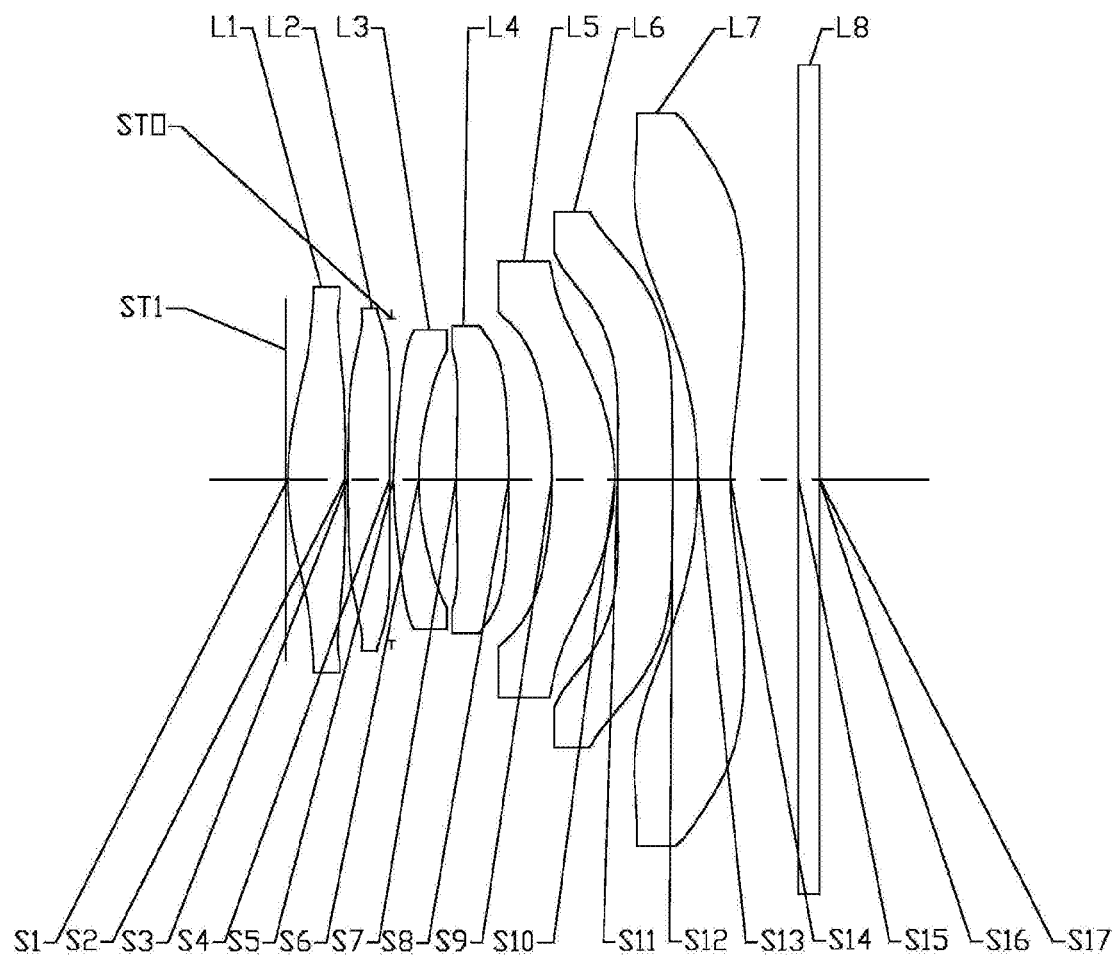
FIG. 9 is a schematic structural diagram illustrating an optical imaging system according to Embodiment 5 of the present disclosure.

FIG. 9 shows a schematic structural diagram of the optical imaging system according to Embodiment 5 of the present disclosure. As shown in FIG. 9, the optical imaging system according to Embodiment 5 includes first to seventh lenses L1-L7 respectively having an object side surface and an image side surface. The optical imaging system according to Embodiment 5 may include a filter L8 having an object side surface S15 and an image side surface S16, and the filter L8 may be used to correct a chromatic aberration. Light from an object successively passes through the surfaces S1 to S16 and is finally imaged on an image plane S17.

Table 13 shows the surface type, the radius of curvature, the thickness, the material and the conic coefficient of each lens of the optical imaging system in Embodiment 5. Table 14 shows the higher-order coefficients of each aspheric mirror surface in Embodiment 5. Table 15 shows the effective focal lengths f1 to f7 of the lenses, the total effective focal length f of the optical imaging system, the half of the diagonal length of the effective pixel area on the image plane ImgH of the optical imaging system, the half of the maximum field-of-view angle HFOV of the optical imaging system, the f-number Fno of the optical imaging system and the distance TTL from the object side surface S1 of the first lens L1 to the image plane S17 of the optical imaging system on the optical axis in Embodiment 5. Here, the respective aspheric surface types may be defined by the formula (1) given in the above Embodiment 1.

TABLE 13

| Surface Number | Surface Type | Radius of Curvature | Thickness | Material Refractive Index | Material Abbe Number | Conic Coefficient |
|---|---|---|---|---|---|---|
| OBJ | spherical | infinite | infinite | | | |
| ST1 | spherical | infinite | 0.0207 | | | |
| S1 | aspheric | 2.2968 | 0.2863 | 1.546 | 56.11 | −3.3584 |
| S2 | aspheric | 3.1985 | 0.0624 | | | −9.0949 |
| S3 | aspheric | 3.4903 | 0.6628 | 1.546 | 56.11 | −17.9814 |
| S4 | aspheric | −22.0570 | 0.0200 | | | 99.0000 |
| STO | spherical | infinite | 0.0260 | | | |
| S5 | aspheric | 3.3313 | 0.2920 | 1.666 | 20.37 | −15.0120 |
| S6 | aspheric | 2.0724 | 0.3800 | | | 1.0861 |
| S7 | aspheric | 14.3307 | 0.4744 | 1.723 | 41.83 | −64.8828 |
| S8 | aspheric | −11.1413 | 0.5853 | | | −99.0000 |
| S9 | aspheric | −5.9728 | 0.4554 | 1.744 | 44.85 | 0.0000 |
| S10 | aspheric | −2.1752 | 0.0319 | | | −0.2100 |
| S11 | aspheric | −3.7152 | 0.3000 | 1.666 | 20.37 | −25.3896 |
| S12 | aspheric | −4.2345 | 0.3001 | | | 1.0004 |
| S13 | aspheric | −4.1677 | 0.5000 | 1.546 | 56.11 | −0.1333 |
| S14 | aspheric | 2.6497 | 0.6281 | | | −17.9216 |
| S15 | spherical | infinite | 0.2100 | 1.516 | 56.11 | |
| S16 | spherical | infinite | 0.1652 | | | |
| S17 | spherical | infinite | | | | |

TABLE 14

| Surface Number | A4 | A6 | A8 | A10 | A12 | A14 | A16 |
|---|---|---|---|---|---|---|---|
| S1 | −1.4890E−04 | −2.6479E−02 | −3.6071E−03 | 6.6299E−03 | −1.3033E−03 | 0.0000E+00 | 0.0000E+00 |
| S2 | 4.8527E−02 | −9.2259E−02 | 5.1726E−02 | −1.3409E−02 | 1.2698E−03 | 0.0000E+00 | 0.0000E+00 |
| S3 | 1.1584E−01 | −9.0824E−02 | 7.4141E−02 | −3.5265E−02 | 1.0083E−02 | −1.9046E−03 | 1.7281E−04 |
| S4 | −1.6697E−03 | 6.4238E−06 | −1.0481E−08 | 1.2199E−11 | −1.0006E−13 | 3.4700E−14 | −5.8889E−15 |

TABLE 14-continued

| Surface Number | A4 | A6 | A8 | A10 | A12 | A14 | A16 |
|---|---|---|---|---|---|---|---|
| S5 | −2.5203E−02 | 3.6812E−03 | 8.8779E−04 | −3.0309E−04 | 3.3502E−05 | −1.6526E−06 | 3.0816E−08 |
| S6 | −8.5001E−02 | 4.3171E−02 | −6.1408E−02 | 1.0313E−01 | −1.0902E−01 | 5.8888E−02 | −1.2673E−02 |
| S7 | −2.2233E−02 | 1.1860E−02 | −3.8063E−02 | 4.5976E−02 | −3.3917E−02 | 1.1182E−02 | −1.2771E−03 |
| S8 | −4.7491E−02 | −6.4657E−03 | 9.4645E−03 | −3.2516E−02 | 3.0447E−02 | −1.3552E−02 | 2.1677E−03 |
| S9 | −4.3630E−02 | −4.4889E−02 | 8.9471E−03 | 4.6321E−03 | 4.8670E−04 | −8.8643E−04 | 7.9569E−05 |
| S10 | −2.1376E−01 | 4.2312E−01 | −4.2232E−01 | 2.3787E−01 | −7.2729E−02 | 1.1256E−02 | −6.9076E−04 |
| S11 | −3.9543E−01 | 7.0035E−01 | −6.1246E−01 | 3.1748E−01 | −1.0022E−01 | 1.7603E−02 | −1.3122E−03 |
| S12 | −8.2893E−02 | 1.1331E−01 | −5.3838E−02 | 1.2594E−02 | −1.5823E−03 | 1.0192E−04 | −2.6322E−06 |
| S13 | −1.3852E−01 | 7.0654E−02 | −1.5350E−02 | 1.7796E−03 | −1.0563E−04 | 2.5195E−06 | 0.0000E+00 |
| S14 | −5.1067E−02 | 1.5706E−02 | −3.4328E−03 | 3.8094E−04 | −2.0952E−05 | 5.6063E−07 | −5.8537E−09 |

TABLE 15

| | |
|---|---|
| f1 (mm) | 4.671 |
| f2 (mm) | 11.495 |
| f3 (mm) | −6.641 |
| f4 (mm) | 10.457 |
| f5 (mm) | 5.906 |
| f6 (mm) | 16.650 |
| f7 (mm) | −2.635 |
| f (mm) | 4.102 |
| ImgH | 3.600 |
| HFOV (°) | 40.594/40.6 |
| Fno | 1.55 |
| TTL (mm) | 5.287 |

Figure 10A:
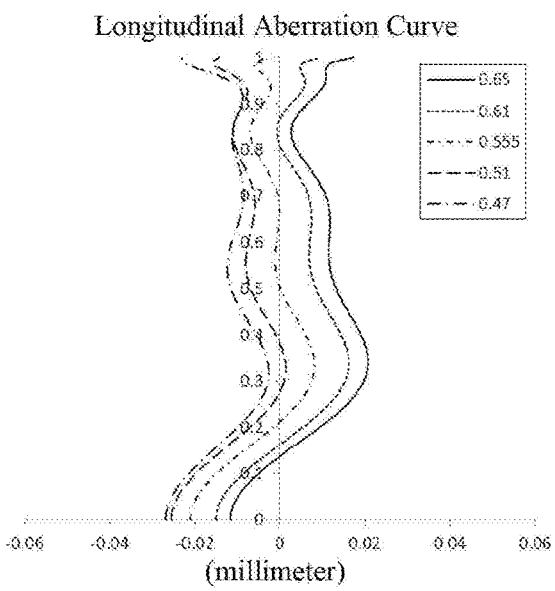
FIG. 10A shows a longitudinal aberration curve of the optical imaging system according to Embodiment 5.
Figure 10B:
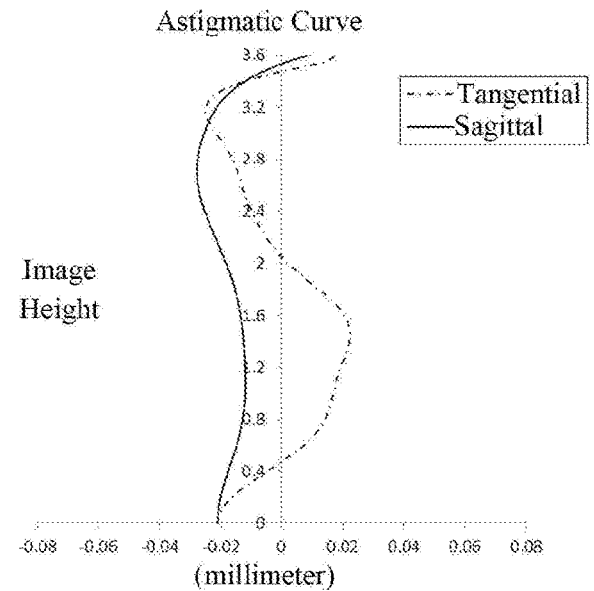
FIG. 10B shows an astigmatic curve of the optical imaging system according to Embodiment 5.
Figure 10C:
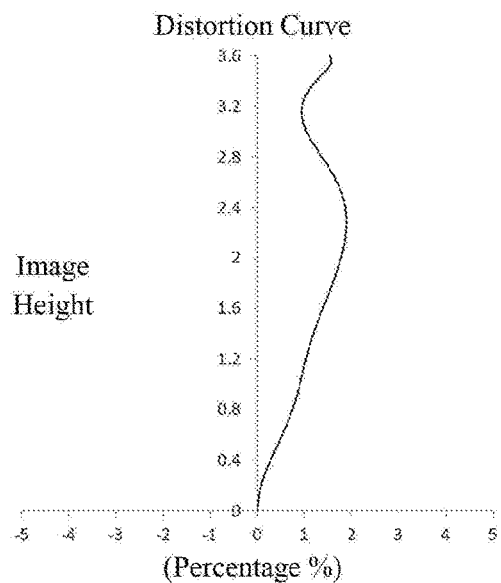
FIG. 10C shows a distortion curve of the optical imaging system according to Embodiment 5.
Figure 10D:
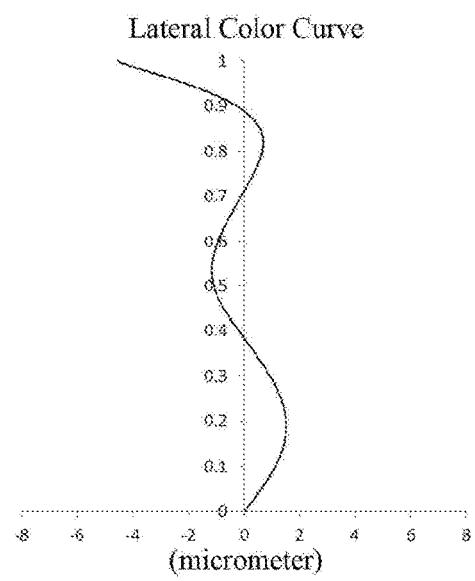
FIG. 10D shows a lateral color curve of the optical imaging system according to Embodiment 5.

FIG. 10A shows a longitudinal aberration curve of the optical imaging system according to Embodiment 5, representing deviations of focal points of light of different wavelengths converged after passing through the optical imaging system. FIG. 10B shows an astigmatic curve of the optical imaging system according to Embodiment 5, representing a curvature of a tangential image plane and a curvature of a sagittal image plane. FIG. 10C shows a distortion curve of the optical imaging system according to Embodiment 5, representing amounts of distortion at different viewing angles. FIG. 10D shows a lateral color curve of the optical imaging system according to Embodiment 5, representing deviations of different image heights on an image plane after light passes through the optical imaging system. It can be seen from FIGS. 10A to 10D that the optical imaging system according to Embodiment 5 can achieve a good image quality.

Embodiment 6

An optical imaging system according to Embodiment 6 of the present disclosure is described below with reference to FIGS. 11 to 12D.

Figure 11:
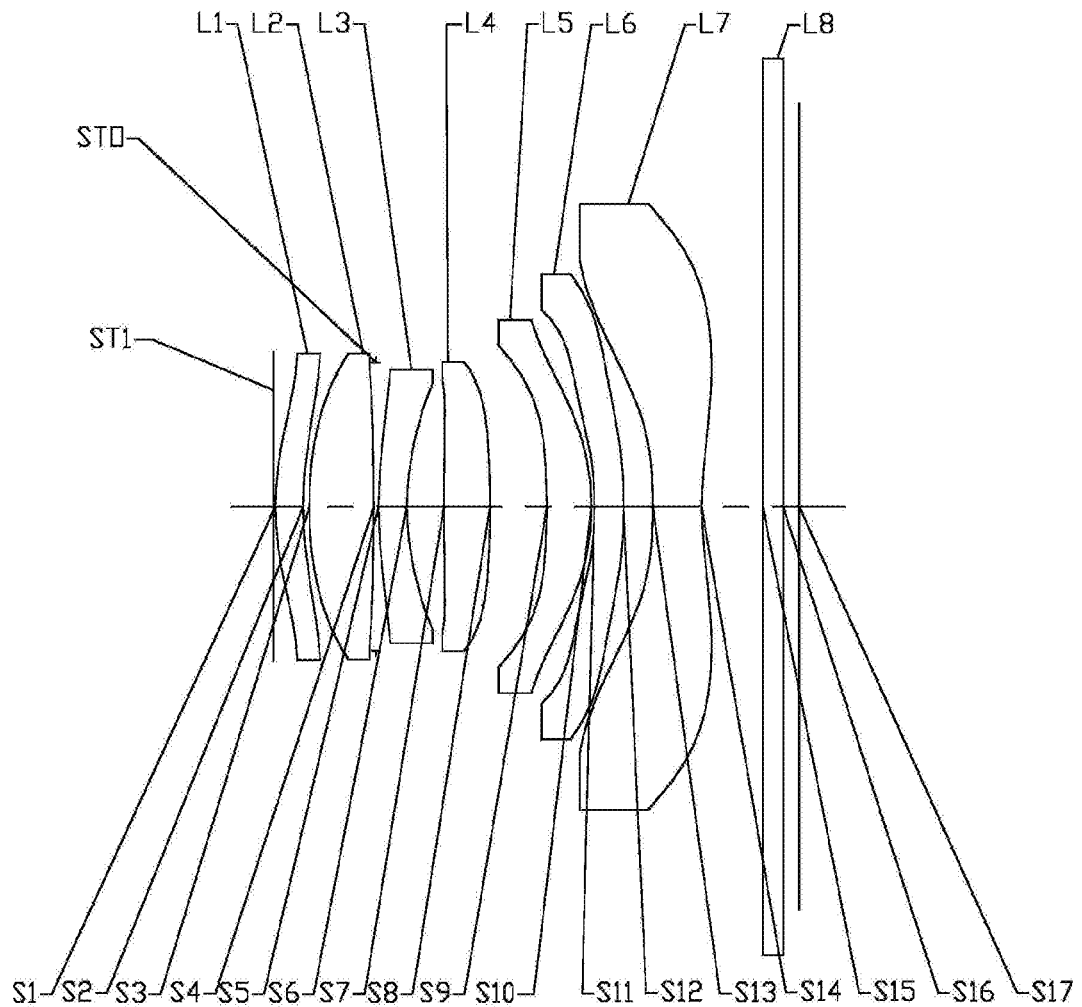
FIG. 11 is a schematic structural diagram illustrating an optical imaging system according to Embodiment 6 of the present disclosure.

FIG. 11 shows a schematic structural diagram of the optical imaging system according to Embodiment 6 of the present disclosure. As shown in FIG. 11, the optical imaging system according to Embodiment 6 includes first to seventh lenses L1-L7 respectively having an object side surface and an image side surface. The optical imaging system according to Embodiment 6 may include a filter L8 having an object side surface S15 and an image side surface S16, and the filter L8 may be used to correct a chromatic aberration. Light from an object successively passes through the surfaces S1 to S16 and is finally imaged on an image plane S17.

Table 16 shows the surface type, the radius of curvature, the thickness, the material and the conic coefficient of each lens of the optical imaging system in Embodiment 6. Table 17 shows the higher-order coefficients of each aspheric mirror surface in Embodiment 6. Table 18 shows the effective focal lengths f1 to f7 of the lenses, the total effective focal length f of the optical imaging system, the half of the diagonal length of the effective pixel area on the image plane ImgH of the optical imaging system, the half of the maximum field-of-view angle HFOV of the optical imaging system, the f-number Fno of the optical imaging system and the distance TTL from the object side surface S1 of the first lens L1 to the image plane S17 of the optical imaging system on the optical axis in Embodiment 6. Here, the respective aspheric surface types may be defined by the formula (1) given in the above Embodiment 1.

TABLE 16

| Surface Number | Surface Type | Radius of Curvature | Thickness | Material Refractive Index | Material Abbe Number | Conic Coefficient |
|---|---|---|---|---|---|---|
| OBJ | spherical | infinite | infinite | | | |
| ST1 | spherical | infinite | 0.0207 | | | |
| S1 | aspheric | 2.2701 | 0.2883 | 1.546 | 56.11 | −3.3325 |
| S2 | aspheric | 3.1232 | 0.0569 | | | −9.3359 |
| S3 | aspheric | 3.3783 | 0.6681 | 1.546 | 56.11 | −17.6063 |
| S4 | aspheric | −25.4818 | 0.0200 | | | 99.0000 |
| STO | spherical | infinite | 0.0232 | | | |
| S5 | aspheric | 3.3199 | 0.2927 | 1.666 | 20.37 | −14.6601 |
| S6 | aspheric | 2.0544 | 0.3394 | | | 1.0973 |
| S7 | aspheric | 14.3772 | 0.4469 | 1.738 | 42.02 | −67.7960 |
| S8 | aspheric | −11.5079 | 0.6185 | | | −99.0000 |
| S9 | aspheric | −5.4035 | 0.4551 | 1.744 | 44.85 | 0.0000 |
| S10 | aspheric | −2.1137 | 0.0340 | | | −0.2861 |
| S11 | aspheric | −3.4294 | 0.3500 | 1.666 | 20.37 | −21.8510 |
| S12 | aspheric | −3.7777 | 0.2790 | | | −0.1900 |
| S13 | aspheric | −4.4742 | 0.5000 | 1.546 | 56.11 | −0.0899 |
| S14 | aspheric | 2.5550 | 0.6304 | | | −14.3222 |

TABLE 16-continued

| Surface Number | Surface Type | Radius of Curvature | Thickness | Material Refractive Index | Abbe Number | Conic Coefficient |
|---|---|---|---|---|---|---|
| S15 | spherical | infinite | 0.2100 | 1.516 | 56.11 | |
| S16 | spherical | infinite | 0.1675 | | | |
| S17 | spherical | infinite | | | | |

TABLE 17

| Surface Number | A4 | A6 | A8 | A10 | A12 | A14 | A16 |
|---|---|---|---|---|---|---|---|
| S1 | 4.2125E−03 | −3.3195E−02 | −2.9426E−03 | 9.4868E−03 | −2.3601E−03 | 0.0000E+00 | 0.0000E+00 |
| S2 | 5.6682E−02 | −1.1857E−01 | 7.8216E−02 | −2.3832E−02 | 2.5499E−03 | 0.0000E+00 | 0.0000E+00 |
| S3 | 1.1710E−01 | −9.2202E−02 | 6.4348E−02 | −8.4102E−03 | −1.4146E−02 | 7.2920E−03 | −1.0767E−03 |
| S4 | −1.6973E−02 | 7.5507E−02 | −1.4263E−01 | 1.4141E−01 | −8.1925E−02 | 2.6780E−02 | −3.8082E−03 |
| S5 | −4.0241E−02 | 9.7083E−02 | −2.0962E−01 | 2.5267E−01 | −1.8404E−01 | 7.8450E−02 | −1.4877E−02 |
| S6 | −8.5142E−02 | 5.0245E−02 | −4.4159E−02 | 1.1568E−02 | 1.4104E−02 | −1.1281E−02 | 2.6108E−03 |
| S7 | −1.8938E−02 | −1.2362E−03 | 1.2170E−02 | −6.2751E−02 | 9.0064E−02 | −6.5696E−02 | 1.9176E−02 |
| S8 | −4.5024E−02 | 1.2120E−03 | −1.8146E−02 | 3.4104E−03 | 5.8017E−03 | −7.0060E−03 | 2.1692E−03 |
| S9 | −4.3723E−02 | −4.5511E−02 | 8.7529E−03 | 4.6436E−03 | 5.6724E−04 | −7.9792E−04 | 7.9569E−05 |
| S10 | −1.8630E−01 | 3.3290E−01 | −3.1158E−01 | 1.6820E−01 | −4.6817E−02 | 5.7155E−03 | −1.6943E−04 |
| S11 | −3.4540E−01 | 5.4635E−01 | −4.2615E−01 | 1.9847E−01 | −5.7028E−02 | 9.1355E−03 | −6.1240E−04 |
| S12 | −6.6738E−02 | 7.7769E−02 | −2.4667E−02 | 3.2843E−04 | 1.3043E−03 | −2.6278E−04 | 1.7034E−05 |
| S13 | −1.5037E−01 | 8.3445E−02 | −2.1394E−02 | 3.4341E−03 | −3.4939E−04 | 1.6887E−05 | 0.0000E+00 |
| S14 | −6.4027E−02 | 2.5784E−02 | −7.7388E−03 | 1.4592E−03 | −1.7829E−04 | 1.3245E−05 | −4.5607E−07 |

TABLE 18

| | |
|---|---|
| f1 (mm) | 13.418 |
| f2 (mm) | 5.571 |
| f3 (mm) | −9.070 |
| f4 (mm) | 8.702 |
| f5 (mm) | 4.357 |
| f6 (mm) | −59.117 |
| f7 (mm) | −2.892 |
| f (mm) | 4.236 |
| ImgH | 3.582 |
| HFOV (°) | 39.566/39.6 |
| Fno | 1.55 |
| TTL (mm) | 5.380 |

Figure 12A:
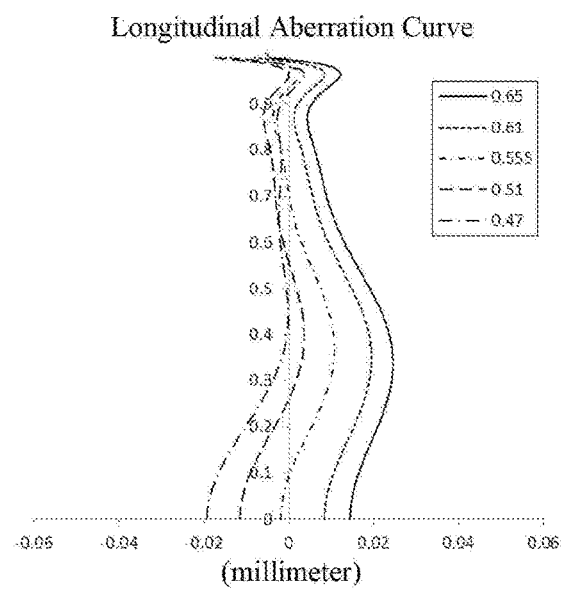
FIG. 12A shows a longitudinal aberration curve of the optical imaging system according to Embodiment 6.
Figure 12B:
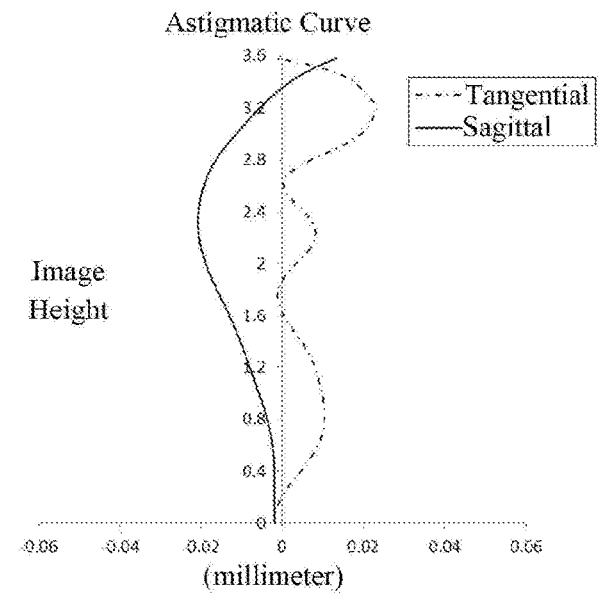
FIG. 12B shows an astigmatic curve of the optical imaging system according to Embodiment 6.
Figure 12C:
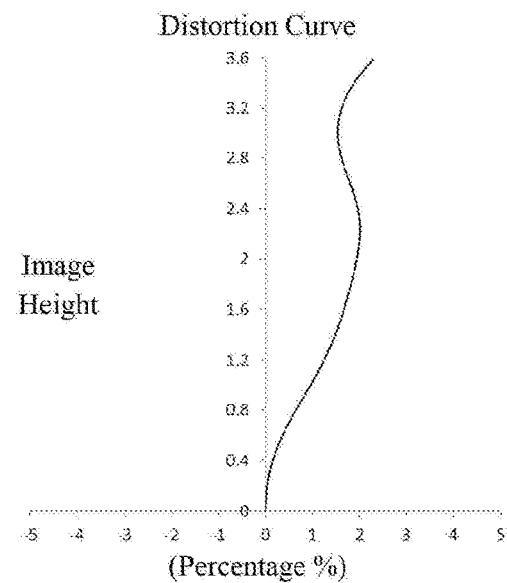
FIG. 12C shows a distortion curve of the optical imaging system according to Embodiment 6.
Figure 12D:
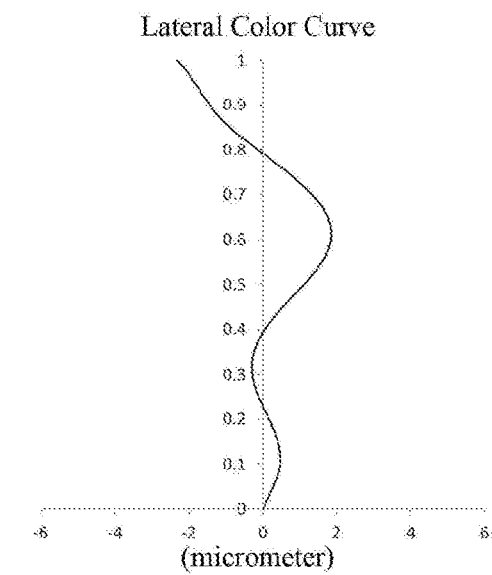
FIG. 12D shows a lateral color curve of the optical imaging system according to Embodiment 6.

FIG. 12A shows a longitudinal aberration curve of the optical imaging system according to Embodiment 6, representing deviations of focal points of light of different wavelengths converged after passing through the optical imaging system. FIG. 12B shows an astigmatic curve of the optical imaging system according to Embodiment 6, representing a curvature of a tangential image plane and a curvature of a sagittal image plane. FIG. 12C shows a distortion curve of the optical imaging system according to Embodiment 6, representing amounts of distortion at different viewing angles. FIG. 12D shows a lateral color curve of the optical imaging system according to Embodiment 6, representing deviations of different image heights on an image plane after light passes through the optical imaging system. It can be seen from FIGS. 12A to 12D that the optical imaging system according to Embodiment 6 can achieve a good image quality.

Embodiment 7

An optical imaging system according to Embodiment 7 of the present disclosure is described below with reference to FIGS. 13 to 14D.

Figure 13:
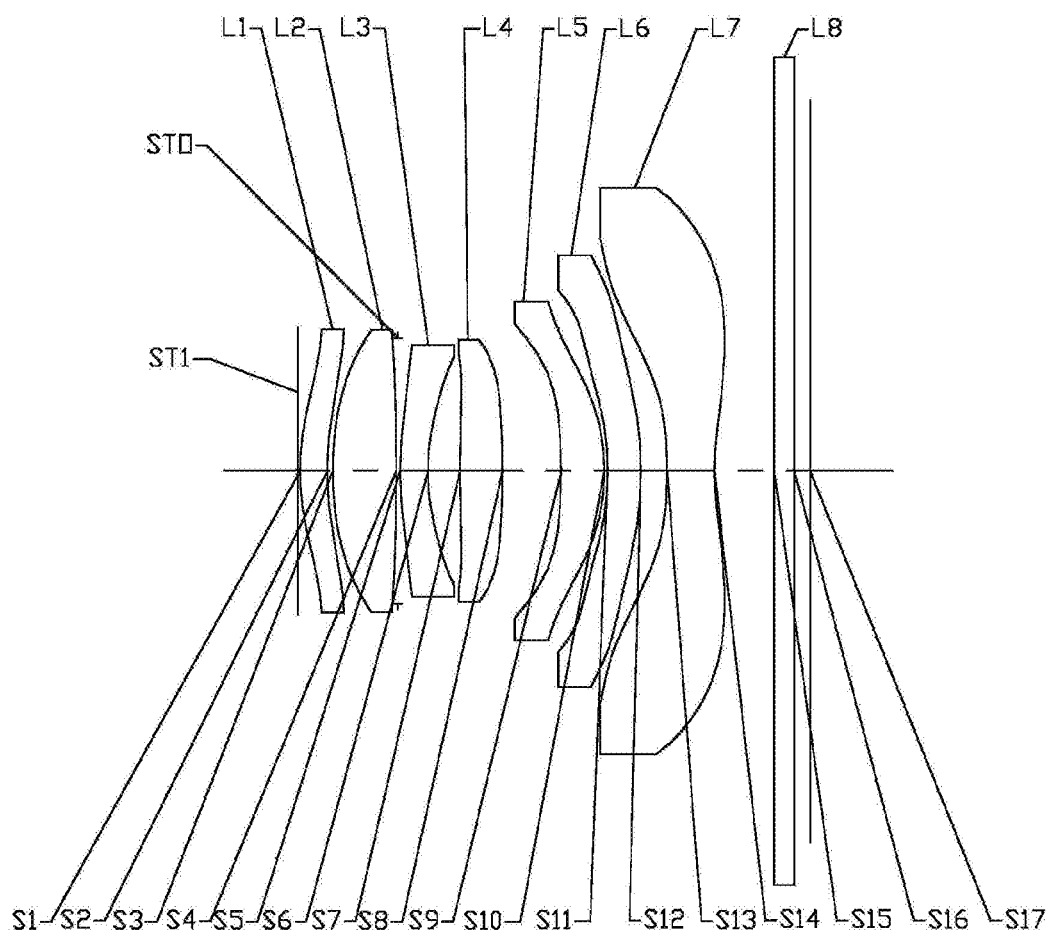
FIG. 13 is a schematic structural diagram illustrating an optical imaging system according to Embodiment 7 of the present disclosure.

FIG. 13 shows a schematic structural diagram of the optical imaging system according to Embodiment 7 of the present disclosure. As shown in FIG. 13, the optical imaging system according to Embodiment 7 includes first to seventh lenses L1-L7 respectively having an object side surface and an image side surface. The optical imaging system according to Embodiment 7 may include a filter L8 having an object side surface S15 and an image side surface S16, and the filter L8 may be used to correct a chromatic aberration. Light from an object successively passes through the surfaces S1 to S16 and is finally imaged on an image plane S17.

Table 19 shows the surface type, the radius of curvature, the thickness, the material and the conic coefficient of each lens of the optical imaging system in Embodiment 7. Table 20 shows the higher-order coefficients of each aspheric mirror surface in Embodiment 7. Table 21 shows the effective focal lengths f1 to f7 of the lenses, the total effective focal length f of the optical imaging system, the half of the diagonal length of the effective pixel area on the image plane ImgH of the optical imaging system, the half of the maximum field-of-view angle HFOV of the optical imaging system, the f-number Fno of the optical imaging system and the distance TTL from the object side surface S1 of the first lens L1 to the image plane S17 of the optical imaging system on the optical axis in Embodiment 7. Here, the respective aspheric surface types may be defined by the formula (1) given in the above Embodiment 1.

TABLE 19

| Surface Number | Surface Type | Radius of Curvature | Thickness | Material Refractive Index | Abbe Number | Conic Coefficient |
|---|---|---|---|---|---|---|
| OBJ | spherical | infinite | infinite | | | |
| ST1 | spherical | infinite | 0.0207 | | | |
| S1 | aspheric | 2.2701 | 0.2883 | 1.546 | 56.11 | −3.3325 |
| S2 | aspheric | 3.1232 | 0.0569 | | | −9.3359 |
| S3 | aspheric | 3.3783 | 0.6681 | 1.546 | 56.11 | −17.6063 |
| S4 | aspheric | −25.4818 | 0.0200 | | | 99.0000 |
| STO | spherical | infinite | 0.0232 | | | |
| S5 | aspheric | 3.3199 | 0.2927 | 1.666 | 20.37 | −14.6601 |
| S6 | aspheric | 2.0544 | 0.3394 | | | 1.0973 |
| S7 | aspheric | 14.3772 | 0.4469 | 1.738 | 42.02 | −67.7960 |
| S8 | aspheric | −11.5079 | 0.6185 | | | −99.0000 |
| S9 | aspheric | −5.4035 | 0.4551 | 1.744 | 44.85 | 0.0000 |
| S10 | aspheric | −2.1137 | 0.0340 | | | −0.2861 |
| S11 | aspheric | −3.4294 | 0.3500 | 1.666 | 20.37 | −21.8510 |
| S12 | aspheric | −3.7777 | 0.2790 | | | −0.1900 |
| S13 | aspheric | −4.4742 | 0.5000 | 1.546 | 56.11 | −0.0899 |
| S14 | aspheric | 2.5550 | 0.6304 | | | −14.3222 |
| S15 | spherical | infinite | 0.2100 | 1.516 | 56.11 | |
| S16 | spherical | infinite | 0.1675 | | | |
| S17 | spherical | infinite | | | | |

TABLE 20

| Surface Number | A4 | A6 | A8 | A10 | A12 | A14 | A16 |
|---|---|---|---|---|---|---|---|
| S1 | 4.2125E−03 | −3.3195E−02 | −2.9426E−03 | 9.4868E−03 | −2.3601E−03 | 0.0000E+00 | 0.0000E+00 |
| S2 | 5.6682E−02 | −1.1857E−01 | 7.8216E−02 | −2.3832E−02 | 2.5499E−03 | 0.0000E+00 | 0.0000E+00 |
| S3 | 1.1710E−01 | −9.2202E−02 | 6.4348E−02 | −8.4102E−03 | −1.4146E−02 | 7.2920E−03 | −1.0767E−03 |
| S4 | −1.6973E−02 | 7.5507E−02 | −1.4263E−01 | 1.4141E−01 | −8.1925E−02 | 2.6780E−02 | −3.8082E−03 |
| S5 | −4.0241E−02 | 9.7083E−02 | −2.0962E−01 | 2.5267E−01 | −1.8404E−01 | 7.8450E−02 | −1.4877E−02 |
| S6 | −8.5142E−02 | 5.0245E−02 | −4.4159E−02 | 1.1568E−02 | 1.4104E−02 | −1.1281E−02 | 2.6108E−03 |
| S7 | −1.8938E−02 | −1.2362E−03 | 1.2170E−02 | −6.2751E−02 | 9.0064E−02 | −6.5696E−02 | 1.9176E−02 |
| S8 | −4.5024E−02 | 1.2120E−03 | −1.8146E−02 | 3.4104E−03 | 5.8017E−03 | −7.0060E−03 | 2.1692E−03 |
| S9 | −4.3723E−02 | −4.5511E−02 | 8.7529E−03 | 4.6436E−03 | 5.6724E−04 | −7.9792E−04 | 7.9569E−05 |
| S10 | −1.8630E−01 | 3.3290E−01 | −3.1158E−01 | 1.6820E−01 | −4.6817E−02 | 5.7155E−03 | −1.6943E−04 |
| S11 | −3.4540E−01 | 5.4635E−01 | −4.2615E−01 | 1.9847E−01 | −5.7028E−02 | 9.1355E−03 | −6.1240E−04 |
| S12 | −6.6738E−02 | 7.7769E−02 | −2.4667E−02 | 3.2843E−04 | 1.3043E−03 | −2.6278E−04 | 1.7034E−05 |
| S13 | −1.5037E−01 | 8.3445E−02 | −2.1394E−02 | 3.4341E−03 | −3.4939E−04 | 1.6887E−05 | 0.0000E+00 |
| S14 | −6.4027E−02 | 2.5784E−02 | −7.7388E−03 | 1.4592E−03 | −1.7829E−04 | 1.3245E−05 | −4.5607E−07 |

TABLE 21

| | |
|---|---|
| f1 (mm) | 13.600 |
| f2 (mm) | 5.509 |
| f3 (mm) | −8.911 |
| f4 (mm) | 8.683 |
| f5 (mm) | 4.388 |
| f6 (mm) | −93.328 |
| f7 (mm) | −2.906 |
| f (mm) | 4.242 |
| ImgH | 3.582 |
| HFOV (°) | 39.672/39.7 |
| Fno | 1.55 |
| TTL (mm) | 5.380 |

Figure 14A:
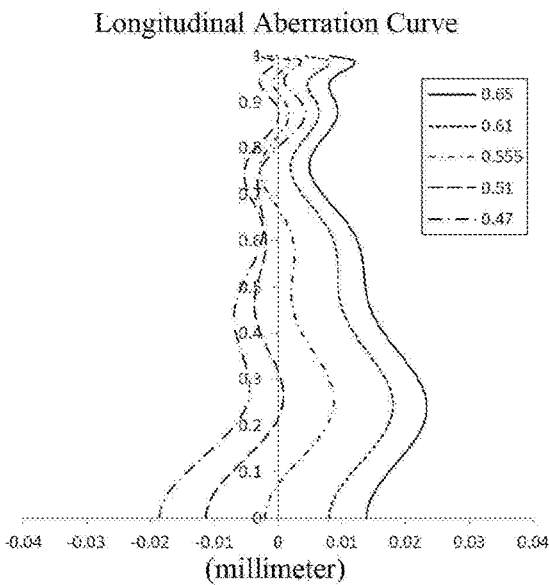
FIG. 14A shows a longitudinal aberration curve of the optical imaging system according to Embodiment 7.
Figure 14B:
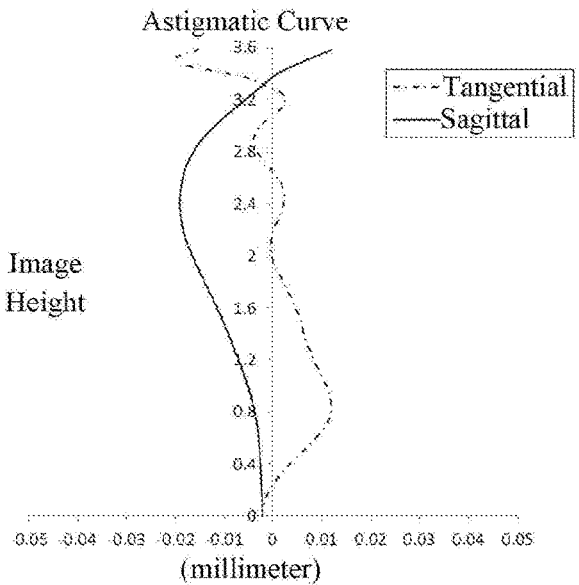
FIG. 14B shows an astigmatic curve of the optical imaging system according to Embodiment 7.
Figure 14C:
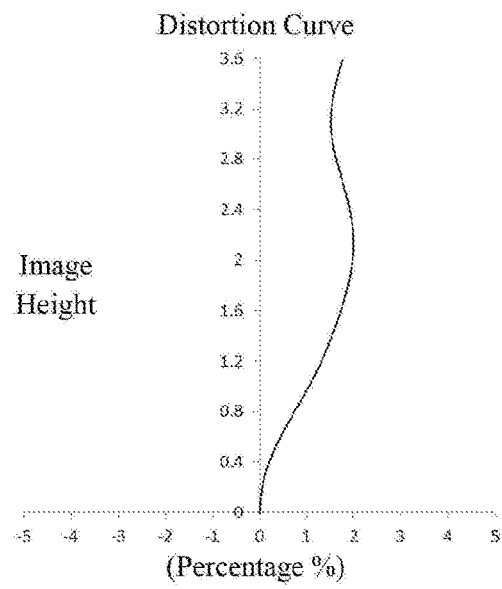
FIG. 14C shows a distortion curve of the optical imaging system according to Embodiment 7.
Figure 14D:
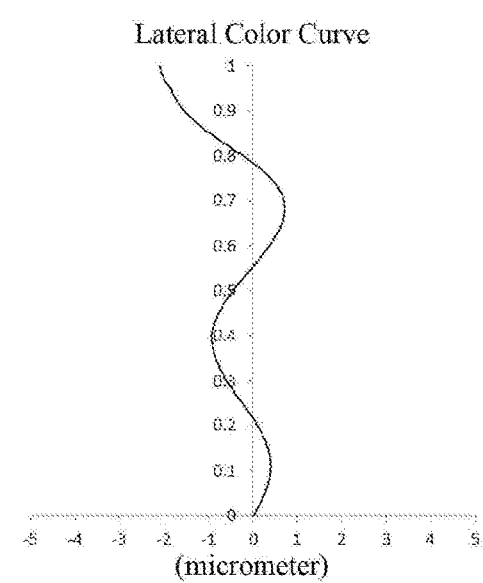
FIG. 14D shows a lateral color curve of the optical imaging system according to Embodiment 7.

FIG. 14A shows a longitudinal aberration curve of the optical imaging system according to Embodiment 7, representing deviations of focal points of light of different wavelengths converged after passing through the optical imaging system. FIG. 14B shows an astigmatic curve of the optical imaging system according to Embodiment 7, representing a curvature of a tangential image plane and a curvature of a sagittal image plane. FIG. 14C shows a distortion curve of the optical imaging system according to Embodiment 7, representing amounts of distortion at different viewing angles. FIG. 14D shows a lateral color curve of the optical imaging system according to Embodiment 7, representing deviations of different image heights on an image plane after light passes through the optical imaging system. It can be seen from FIGS. 14A to 14D that the optical imaging system according to Embodiment 7 can achieve a good image quality.

In summary, Embodiment 1 to Embodiment 7 satisfy relationships shown in Table 22 below, respectively.

TABLE 22

| Conditional Expression | Embodiment | | | | | | |
|---|---|---|---|---|---|---|---|
| | 1 | 2 | 3 | 4 | 5 | 6 | 7 |
| f/EPD | 1.549 | 1.550 | 1.550 | 1.550 | 1.549 | 1.550 | 1.550 |
| TTL/ImgH | 1.440 | 1.476 | 1.516 | 1.546 | 1.469 | 1.502 | 1.502 |
| R13/R14 | −1.159 | −1.343 | −1.778 | −1.099 | −1.206 | −1.573 | −1.751 |

TABLE 22-continued

| Conditional Expression | Embodiment | | | | | | |
|---|---|---|---|---|---|---|---|
| | 1 | 2 | 3 | 4 | 5 | 6 | 7 |
| \|f5/f7\| | −2.047 | −1.918 | −1.533 | −2.322 | −2.241 | −1.506 | −1.510 |
| T34/T45 | 0.844 | 0.886 | 0.540 | 0.559 | 0.866 | 0.660 | 0.549 |
| SL/TTL | 0.796 | 0.804 | 0.803 | 0.798 | 0.805 | 0.808 | 0.808 |
| (CT1 + CT2)/CT4 | 2.068 | 2.012 | 2.094 | 2.122 | 1.880 | 2.001 | 2.140 |
| CT2/CT4 | 0.942 | 0.890 | 1.498 | 1.477 | 0.794 | 1.397 | 1.495 |
| SAG41/SAG42 | 0.208 | 0.240 | 0.439 | 0.016 | 0.205 | 0.058 | 0.053 |
| f12/f56 | 0.836 | 0.855 | 0.855 | 1.109 | 0.796 | 0.841 | 0.849 |
| DT11/DT52 | 0.831 | 0.917 | 0.848 | 0.865 | 0.922 | 0.822 | 0.836 |
| ImgH/f | 0.871 | 0.850 | 0.854 | 0.853 | 0.878 | 0.846 | 0.844 |

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, such as technical solutions formed by replacing the features as disclosed in the present disclosure with (but not limited to) technical features with similar functions.

What is claimed is:

1. An optical imaging system, having an effective focal length f and an entrance pupil diameter EPD, and the optical imaging system comprising sequentially, along an optical axis from an object side to an image side, a first lens, a second lens, a third lens, a fourth lens, a fifth lens, a sixth lens and a seventh lens,
wherein an image side surface of the second lens is a convex surface;
the third lens has a negative refractive power;
the fifth lens has a positive refractive power or a negative refractive power, and an image side surface of the fifth lens is a convex surface;
the seventh lens has a positive refractive power or a negative refractive power, and an object side surface of the seventh lens is a concave surface;
the first lens, the second lens, the fourth lens, and the sixth lens respectively have a positive refractive power or a negative refractive power;
a distance TTL from an object side surface of the first lens to an image plane on the optical axis and half of a diagonal length ImgH of an effective pixel area on the image plane of the optical imaging system satisfy: TTL/ImgH<1.6; and
the effective focal length f and the entrance pupil diameter EPD satisfy: f/EPD<1.6.

2. The optical imaging system according to claim 1, wherein a distance SL from an aperture of the optical imaging system to the image plane on the optical axis and the distance TTL from the object side surface of the first lens to the image plane on the optical axis satisfy: SL/TTL<0.85.

3. The optical imaging system according to claim 1, wherein a center thickness CT1 of the first lens on the optical axis, a center thickness CT2 of the second lens on the optical axis and a center thickness CT4 of the fourth lens on the optical axis satisfy: 1.5<(CT1+CT2)/CT4<2.3.

4. The optical imaging system according to claim 3, wherein the center thickness CT2 of the second lens on the optical axis and the center thickness CT4 of the fourth lens on the optical axis satisfy: 0.75<CT2/CT4<1.5.

5. The optical imaging system according to claim 1, wherein 0<SAG41/SAG42<0.5,
wherein SAG41 represents a distance from an intersection point of an object side surface of the fourth lens and the optical axis to an effective radius vertex of the object side surface of the fourth lens on the optical axis; and
SAG42 represents a distance from an intersection point of an image side surface of the fourth lens and the optical axis to an effective radius vertex of the image side surface of the fourth lens on the optical axis.

6. The optical imaging system according to claim 1, wherein a combined focal length f12 of the first lens and the second lens and a combined focal length f56 of the fifth lens and the sixth lens satisfy: 0.6<f12/f56<1.2.

7. The optical imaging system according to claim 1, wherein the half of the diagonal length ImgH of the effective pixel area on the image plane of the optical imaging system and the effective focal length f of the optical imaging system satisfy: 0.8<ImgH/f<1.

8. The optical imaging system according to claim 1, wherein a spacing distance T34 between the third lens and the fourth lens on the optical axis and a spacing distance T45 between the fourth lens and the fifth lens on the optical axis satisfy: 0.5<T34/T45<1.

9. An optical imaging system, having an effective focal length f and an entrance pupil diameter EPD, and the optical imaging system comprising sequentially, along an optical axis from an object side to an image side, a first lens, a second lens, a third lens, a fourth lens, a fifth lens, and a plurality of subsequent lenses,
wherein the third lens has a negative refractive power;
the fifth lens has a positive refractive power or a negative refractive power, and an image side surface of the fifth lens is a convex surface;
the first lens, the second lens and the fourth lens respectively have a positive refractive power or a negative refractive power;
a distance SL from an aperture of the optical imaging system to an image plane on the optical axis and a distance TTL from an object side surface of the first lens to the image plane on the optical axis satisfy: SL/TTL<0.85;
the effective focal length f and the entrance pupil diameter EPD satisfy: f/EPD<1.6; and
the distance TTL from the object side surface of the first lens to the image plane on the optical axis and half of a diagonal length ImgH of an effective pixel area on the image plane of the optical imaging system satisfy: TTL/ImgH<1.6.

10. The optical imaging system according to claim 9, wherein the plurality of subsequent lenses comprise at least a sixth lens and a seventh lens, wherein
the sixth lens has a positive refractive power or a negative refractive power; and
the seventh lens has a positive refractive power or a negative refractive power, and an object side surface of the seventh lens is a concave surface.

11. The optical imaging system according to claim 10, wherein a combined focal length f12 of the first lens and the second lens and a combined focal length f56 of the fifth lens and the sixth lens satisfy: $0.6 < f12/f56 < 1.2$.

12. The optical imaging system according to claim 10, wherein an effective focal length f5 of the fifth lens and an effective focal length f7 of the seventh lens satisfy: $1.5 \leq |f5/f7| < 2.5$.

13. The optical imaging system according to claim 10, wherein a radius of curvature R13 of the object side surface of the seventh lens and a radius of curvature R14 of an image side surface of the seventh lens satisfy: $-1.8 < R13/R14 < -1$.

14. The optical imaging system according to claim 9, wherein $0 < SAG41/SAG42 < 0.5$,
wherein SAG41 represents a distance from an intersection point of an object side surface of the fourth lens and the optical axis to an effective radius vertex of the object side surface of the fourth lens on the optical axis; and
SAG42 represents a distance from an intersection point of an image side surface of the fourth lens and the optical axis to an effective radius vertex of the image side surface of the fourth lens on the optical axis.

15. The optical imaging system according to claim 9, wherein an effective radius DT11 of the object side surface of the first lens and an effective radius DT52 of the image side surface of the fifth lens satisfy: $0.7 < DT11/DT52 < 1$.

16. The optical imaging system according to claim 9, wherein half of the diagonal length of the effective pixel area on the image plane of the optical imaging system ImgH and the effective focal length f of the optical imaging system satisfy: $0.8 < ImgH/f < 1$.

17. The optical imaging system according to claim 9, wherein a spacing distance T34 between the third lens and the fourth lens on the optical axis and a spacing distance T45 between the fourth lens and the fifth lens on the optical axis satisfy: $0.5 < T34/T45 < 1$.

* * * * *